(12) United States Patent
Blanco et al.

(10) Patent No.: US 7,443,401 B2
(45) Date of Patent: Oct. 28, 2008

(54) MULTIPLE-LEVEL GRAPHICS PROCESSING WITH ANIMATION INTERVAL GENERATION

(75) Inventors: Leonardo E. Blanco, Redmond, WA (US); Paul C. David, Kirkland, WA (US); Matthew W. Calkins, Seattle, WA (US); Andrei Baioura, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 262 days.

(21) Appl. No.: 10/693,822

(22) Filed: Oct. 23, 2003

(65) Prior Publication Data

US 2004/0130550 A1 Jul. 8, 2004

Related U.S. Application Data

(63) Continuation-in-part of application No. 10/184,795, filed on Jun. 27, 2002, now Pat. No. 7,161,599.

(60) Provisional application No. 60/330,244, filed on Oct. 18, 2001.

(51) Int. Cl.
*G06T 15/70* (2006.01)
(52) U.S. Cl. ........................... 345/473; 345/475
(58) Field of Classification Search .................. None
See application file for complete search history.

(56) References Cited

U.S. PATENT DOCUMENTS

| 5,261,041 | A | * | 11/1993 | Susman | ................. | 345/473 |
| 5,487,172 | A | | 1/1996 | Hyatt | ................. | 395/800 |
| 5,500,933 | A | * | 3/1996 | Schnorf | ................. | 715/500.1 |
| 5,509,115 | A | | 4/1996 | Butterfield | | |
| 5,553,222 | A | * | 9/1996 | Milne et al. | ............... | 715/500.1 |
| 5,555,368 | A | * | 9/1996 | Orton et al. | ................. | 715/807 |

(Continued)

FOREIGN PATENT DOCUMENTS

WO WO99/00725 A 1/1999

(Continued)

OTHER PUBLICATIONS

Hudson, S. E. and Stasko, J. T., Animation Support in a User Interface Toolkit: Flexible, Robust, and Reusable Abstractions, ACM SIGGRAPH Symposium on User Interface Software and Technology, Atlanta, GA, 57-67, 1993.*

(Continued)

*Primary Examiner*—Ulka Chauhan
*Assistant Examiner*—Daniel F Hajnik

(57) ABSTRACT

Described is a method and system in which timing intervals are generated from clock properties, and used to interpolate values for smooth animation. A high-level component maintains a set of clocks related to animated objects and/or linear media in a scene graphs. The clocks correspond to clock properties received from an application program. The clocks are processed into event lists at the higher level, from which timing interval data is generated and passed to a low-level component. The low-level component, which generally operates at a faster rate than the high-level component, uses the timing interval data to rapidly calculate current values for an animated object. Interaction, such as to pause an animation or resume a paused animation, causes the high-level component to re-compute the event list and regenerate new animation intervals for affected clocks. The new animation intervals are passed and used by the lower-level component.

26 Claims, 28 Drawing Sheets

U.S. PATENT DOCUMENTS

| | | | | |
|---|---|---|---|---|
| 5,727,141 | A * | 3/1998 | Hoddie et al. | 345/475 |
| 5,745,761 | A | 4/1998 | Celi | |
| 5,752,029 | A | 5/1998 | Wissner | |
| 5,790,130 | A | 8/1998 | Gannett | |
| 5,852,449 | A | 12/1998 | Esslinger | 345/473 |
| 5,920,325 | A * | 7/1999 | Morgan et al. | 345/473 |
| 5,930,810 | A | 7/1999 | Farros | 707/506 |
| 5,936,632 | A | 8/1999 | Cunniff | |
| 5,986,667 | A | 11/1999 | Jevans | 345/433 |
| 5,986,675 | A * | 11/1999 | Anderson et al. | 345/473 |
| 5,987,627 | A | 11/1999 | Rawlings | |
| 6,014,139 | A | 1/2000 | Watson | 345/339 |
| 6,075,532 | A * | 6/2000 | Colleran et al. | 345/473 |
| 6,092,107 | A | 7/2000 | Eleftheriadis | 709/217 |
| 6,115,713 | A | 9/2000 | Pascucci | |
| 6,151,134 | A | 11/2000 | Deppa | |
| 6,154,215 | A | 11/2000 | Hopcroft | 345/418 |
| 6,160,907 | A | 12/2000 | Robotham | |
| 6,195,694 | B1 | 2/2001 | Chen | 709/220 |
| 6,215,495 | B1 | 4/2001 | Grantham | 345/419 |
| 6,237,092 | B1 | 5/2001 | Hayes, Jr. | 713/100 |
| 6,243,856 | B1 | 6/2001 | Meyer | 717/1 |
| 6,259,451 | B1 | 7/2001 | Tesler | 345/419 |
| 6,266,053 | B1 | 7/2001 | French | 345/302 |
| 6,272,650 | B1 | 8/2001 | Meyer | 714/38 |
| 6,275,857 | B1 | 8/2001 | McCartney | 709/226 |
| 6,314,470 | B1 | 11/2001 | Ward | 709/328 |
| 6,377,263 | B1 | 4/2002 | Falacara | 345/473 |
| 6,411,297 | B1 | 6/2002 | Tampieri | 345/426 |
| 6,487,565 | B1 | 11/2002 | Schechter | 707/500.1 |
| 6,538,656 | B1 | 3/2003 | Cheung | 345/519 |
| 6,570,578 | B1 | 5/2003 | Smirnov | |
| 6,631,403 | B1 | 10/2003 | Deutsch | |
| 6,636,211 | B2 | 10/2003 | Chartier | |
| 6,654,931 | B1 | 11/2003 | Haskell | |
| 6,675,230 | B1 | 1/2004 | Lewallen | 709/328 |
| 6,707,456 | B1 | 3/2004 | Marrin | 345/473 |
| 6,714,201 | B1 * | 3/2004 | Grinstein et al. | 345/474 |
| 6,717,599 | B1 | 4/2004 | Olano | 345/853 |
| 6,731,314 | B1 * | 5/2004 | Cheng et al. | 715/848 |
| 6,732,109 | B2 | 5/2004 | Lindberg | 707/101 |
| 6,741,242 | B1 | 5/2004 | Itoh | 345/419 |
| 6,751,655 | B1 | 6/2004 | Deutsch | 709/203 |
| 6,765,571 | B2 | 7/2004 | Sowizral | 345/420 |
| 6,833,840 | B2 | 12/2004 | Lifshitz | |
| 6,919,891 | B2 | 7/2005 | Schneider | 345/440 |
| 6,986,101 | B2 | 1/2006 | Cooper | 707/513 |
| 7,012,606 | B2 | 3/2006 | Swedberg | 345/420 |
| 7,055,092 | B2 | 5/2006 | Yardumian | 715/513 |
| 7,064,766 | B2 | 6/2006 | Beda | 345/557 |
| 7,069,503 | B2 | 6/2006 | Tanimoto | 715/513 |
| 7,076,332 | B2 | 7/2006 | Cifra | 700/245 |
| 7,088,374 | B2 | 8/2006 | David | 345/420 |
| 7,102,654 | B2 | 9/2006 | Louveaux | |
| 7,103,581 | B1 | 9/2006 | Suen | |
| 7,103,873 | B2 | 9/2006 | Tanner | 717/109 |
| 7,126,606 | B2 | 10/2006 | Beda | 345/473 |
| 7,143,339 | B2 | 11/2006 | Weinberg | 707/509 |
| 7,161,599 | B2 | 1/2007 | Beda | 345/418 |
| 2001/0000962 | A1 | 5/2001 | Rajan | 375/240.01 |
| 2002/0019844 | A1 | 2/2002 | Kurowski | |
| 2002/0032697 | A1 | 3/2002 | French | 345/440 |
| 2002/0046394 | A1 | 4/2002 | Do | 717/100 |
| 2002/0063704 | A1 | 5/2002 | Sowizral | 345/522 |
| 2003/0028901 | A1 | 2/2003 | Shae | 370/487 |
| 2003/0110297 | A1 | 6/2003 | Tabatabai | 709/246 |
| 2003/0120823 | A1 | 6/2003 | Kim | 709/310 |
| 2003/0194207 | A1 | 10/2003 | Chung | |
| 2003/0210267 | A1 | 11/2003 | Kylberg | |
| 2004/0015740 | A1 | 1/2004 | Dautelle | 710/5 |
| 2004/0039496 | A1 | 2/2004 | Dautelle | 345/619 |
| 2004/0093604 | A1 | 5/2004 | Demsey | 709/1 |
| 2004/0110490 | A1 | 6/2004 | Steele | 455/412.1 |
| 2004/0216139 | A1 | 10/2004 | Rhoda | 709/320 |
| 2004/0220956 | A1 | 11/2004 | Dillon | 707/102 |
| 2005/0050471 | A1 | 3/2005 | Hallisey | 345/853 |
| 2005/0060648 | A1 | 3/2005 | Fennelly | 715/523 |

FOREIGN PATENT DOCUMENTS

WO      WO99/52080 A      10/1999

OTHER PUBLICATIONS

Conal Elliott, Declarative event-oriented programming, Proceedings of the 2nd ACM SIGPLAN international conference on Principles and practice of declarative programming, p, 56-67, Sep. 20-23, 2000, Montreal, Quebec, Canada.*
U.S. Appl. No. 11/555,040, filed Oct. 31, 2006, Beda.
U.S. Appl. No. 11/165,756, filed Jun. 23, 2005, Schneider.
U.S. Appl. No. 11/455,166, filed Jun. 16, 2006, Beda.
U.S. Appl. No. 11/454,719, filed Jun. 16, 2006, Beda.
U.S. Appl. No. 10/693,822, filed Oct. 23, 2003, Blanco.
U.S. Appl. No. 10/401,717, filed Mar. 27, 2003, Beda.
U.S. Appl. No. 10/693,673, filed Oct. 23, 2003, Beda.
U.S. Appl. No. 10/693,633, filed Oct. 23, 2003, Beda.
U.S. Appl. No. 10/693,630, filed Oct. 23, 2003, Subramanian.
U.S. Appl. No. 11/499,257, filed Aug. 4, 2006, David.
PCT Int'l Search Report & Written Opinion on App. No. PCT/US04/25723, 2005.
Partial European Search Report in EP 02023604 documents considered relevant, 2005.
Australian Search Report, Application No. SG 200302787-7 completed Jan. 12, 2005.
Hyun Suk Kim et al: "Scene Graph for Dynamic Virtual Environment: Spangraph" International Journal of Virtual Reality, IPI Press, Colorado Springs, CO, US, vol. 4, No. 2, 2000, pp. 12-18, OP001039706 ISSN: 1081-1451 p. 16, col. 2.
Hudson, S.E. and Stasko, J.T., Animation Support in a User Interface Toolkit: Flexible, Robust, and Reusable Abstractions, ACM SIGGRAPH Symposium on User Interface Software and Technology, Atlanta, GA, 57-67, 1993.
X3D specification (one section from Google cache), sections 6 and 18—http://www.web3d.org/x3dspecifications/ISO-IEC-19775-IS-X3DAbstractSpecification/..., 2005.
Walczak, K. and W. Cellary. "Building Database Applications of Virtual Reality with X-VRML". Proc. 7th. Int. Conf. on 3D Web Technology. 2002, SIGGRAPH. pp. 11-120. ISBN 1-58113-468-1.
Parr, T. And T. Rohaly. "A language for creating and manipulating VRML." Proc. 1st Symposium on Virtual Reality Modeling Lang. 1995, pp. 123-131.
Hesina, G.; Schmalistieg, D.; Furhmann, A.; Purgathofer, W. "Distributed Open Inventor: a practical approach to distributed 3D graphics." Proc. ACM Symp. On Virt. Reality Soft. And Tech. 1999, pp. 74-81.
Strauss, P. and R. Carey. "An Object-Oriented 3D Graphics Toolkit" SIGGRAPH (Proc. 19th Ann. Conf. on Comp. Graph. And Int. Tech.) 1992, pp. 341-349.
Rikk Cary, Gavin Bell, Chris Marrin: "International Standard iso/iec 14772-1: 1997 Virtual Reality Modeling Language (vrml97)" VRML 97, 1997 pp. 1-236 XP002133320 p. 7, paragraph 3.18: pp. 89-99 section 6.20; p. 149, paragraph B.2.
SVG specification version 1.1, Jan. 14, 2003 all sections. http://www.w3.org/TR/SVG.
Java 3D API Specification: Scene Graph Basics. Sun Microsystems, Inc. 1999. http://java.sun.com/products/java-media/3D/forDevelopers/j3dguide/SceneGraphOverview.doc.html.
SVG Tools, Adobe Illustrator, Jul. 6, 2001—http://web.archive.org/web/20010706131221/http://www.adobe.com/svg/tools/other.html.
Scalable Vector Graphics, Adobe SVG Viewer download area, Nov. 2001—http://www.adobe.com/svg/viewer/install/main.html.
W3C Scalable Vector Graphics (SVG)-History-http://www.w3.org/Graphics/SVG/History, 2004.
W3C consortium,/ "XML Base", W3c recommendation Jun. 27, 2001.

Notice of Allowance dated Jul. 2, 2007 cited in related Patent No. 7,265,756 (Copy Attached).

Office Action dated Apr. 4, 2008 cited in related U.S. Appl. No. 11/454,719 (Copy Attached).

Office Action dated Nov. 16, 2007 cited in related U.S. Appl. No. 10/401,717 (Copy Attached).

Office Action dated Nov. 16, 2007 cited in related U.S. Appl. No. 10/693,633 (Copy Attached).

Office Action dated Jul. 17, 2007 cited in related U.S. Appl. No. 10/693,630 (Copy Attached).

Office Action dated Mar. 20, 2008 cited in related U.S. Appl. No. 10/693,630 (Copy Attached).

Office Action dated Oct. 5, 2007 cited in related U.S. Appl. No. 10/693,673 (Copy Attached).

Office Action dated Jan. 10, 2008 cited in related U.S. Appl. No. 10/693,673 (Copy Attached).

Office Action dated Apr. 3, 2008 cited in related U.S. Appl. No. 11/499,257 (Copy Attached).

Notice of Allowance dated may 30, 2008 cited in related U.S. Appl. No. 10/693,633 (Copy Attached).

* cited by examiner

1300

| Instructions | | | | |
|---|---|---|---|---|
| Instruction ID | Flags | Size | Fixed Size Data | Variable Size Data |
| SetMatrix | Flags | Size | 3x3 Matrix | N/A |
| DrawGlyphs | Flags | Size | Glyph Count | Glyph Handles |
| DrawPath | Flags | Size | N/A | Brush, Pen, Path |
| DrawVideo | Flags | Size | Video Resource Handle | N/A |
| DrawImage | Flags | Size | Image Resource Handle | N/A |
| DrawRect | Flags | Size | Rect Coordinates | Brush, Pen |
| PushAlpha | Flags | Size | Bounding Box | N/A |
| PopAlpha | Flags | Size | Alpha | N/A |
| SetOffset | Flags | Size | Vector 2D | N/A |

*FIG. 13*

MULTIPLE-LEVEL GRAPHICS PROCESSING WITH ANIMATION INTERVAL GENERATION

CROSS-REFERENCE TO RELATED APPLICATIONS

The present invention is a continuation-in-part of U.S. patent application Ser. No. 10/184,795, filed Jun. 27, 2002, now U.S. Pat.No. 7,161,599 which claims priority to U.S. Provisional Patent Application Ser. No. 60/330,244, filed Oct. 18, 2001, herein incorporated by reference.

FIELD OF THE INVENTION

The invention relates generally to computer systems, and more particularly to the processing of graphical and other video information for display on computer systems.

BACKGROUND OF THE INVENTION

In contemporary computing systems, the capability of graphics and video hardware is growing at a fast pace. In fact, to an extent, the graphics system in contemporary computing systems may be considered more of a coprocessor than a simple graphics subsystem. At the same time, consumers are expecting more and more quality in displayed images, whether viewing a monitor, television or cellular telephone display, for example.

However, memory and bus speeds have not kept up with the advancements in main processors and/or graphics processors. As a result, the limits of the traditional immediate mode model of accessing graphics on computer systems are being reached. At the same time, developers and consumers are demanding new features and special effects that cannot be met with traditional graphical windowing architectures.

Although certain game programs have been designed to take advantage of the graphics hardware, such game programs operate with different requirements than those of desktop application programs and the like, primarily in that the games do not need to be concerned with other programs that may be concurrently running. Unlike such game programs, applications need to share graphics and other system resources with other applications. They are not, however, generally written in a cooperative, machine-wide sharing model with respect to graphics processing.

For example, performing animation with desktop applications currently requires specialized single-purpose code, or the use of another application. Even then, achieving smooth animation in a multiple windowed environment is difficult if not impossible. In general, this is because accomplishing smooth, high-speed animation requires updating animation parameters and redrawing the scene (which requires traversing and drawing data structures) at a high frame rate, ideally at the hardware refresh rate of the graphics device. However, updating animation parameters and traversing and drawing the data structures that define a scene are generally computationally-intensive. The larger or more animate the scene, the greater the computational requirement, which limits the complexity of a scene that can be animated smoothly.

Compounding the problem is the requirement that each frame of the animation needs to be computed, drawn, and readied for presentation when the graphics hardware performs a display refresh. If the frame is not ready when required by the hardware, the result is a dropped or delayed frame. If enough frames are dropped, there is a noticeable stutter in the animated display. Also, if the frame preparation is not synchronized with the refresh rate, an undesirable effect known as tearing may occur. In practice, contemporary multitasking operating systems divide computational resources among the many tasks on the system. However, the amount of time given for frame processing by the operating system task scheduler will rarely align with the graphics hardware frame rate. Consequently, even when sufficient computational resources exist, the animation system may still miss frames due to scheduling problems. For example, an animation task may be scheduled to run too late, or it may get preempted before completing a frame, and not be rescheduled in time to provide a next frame for the next hardware refresh of the screen. These problems get even more complex if the animated graphics need to be composited with video or other sources of asynchronously generated frames.

In general, the current (e.g., WM_PAINT) model for preparing the frames requires too much data processing to keep up with the refresh rate when complex graphics effects (such as complex animation) are desired. As a result, when complex graphics effects are attempted with conventional models, instead of completing the changes in the next frame that result in the perceived visual effects in time for the next frame, the changes may be added over different frames, causing results that are visually and noticeably undesirable. There are computing models that attempt to allow the changes to be put in selectively, by providing object handles to every object in the scene graph. Such models, however, require applications to track a significant number of objects, and also consume far too many resources, as the object handles are present even when the application does not want to make changes to the objects.

In summary, existing models of accessing graphics on computer systems are becoming inadequate for working with current display hardware and satisfying consumer expectations. A new model for processing graphics and video is needed.

SUMMARY OF THE INVENTION

Briefly, the present invention provides a multiple-level graphics processing system and method (e.g., of an operating system) for providing improved graphics access and output including, for example, smooth animation. In one implementation, the graphics processing system comprises two components, including a tick-on-demand or slow-tick high-level component, and a fast-tick (e.g., at the graphics hardware frame rate or multiple thereof) low-level component. In general, the high-level component traverses a scene to be displayed and updates animation parameters with intervals for later interpolation, and passes simplified data structures to the low-level component. The low-level component processes the data structures to obtain output data, including interpolating any parameter intervals as necessary to obtain instantaneous values, and renders the scene for each frame of animation.

In general, the invention solves the above-identified (and other) problems by factoring the graphics data so the most computationally intensive aspects of updating animation parameters and traversing scene data structures are performed on a less demanding schedule at a high-level processing component. The low-level processing component operates more frequently, but deals with less computationally intensive tasks due to the high-level preprocessing that provides relatively simplified data structures and instructions to process at the lower level. Video frames also may be integrated into the composition during these low-level ticks.

Benefits of this system and method include television-like quality animation as part of an operating system shell, and as an animation engine for animated content. Further benefits include the ability to composite video images with graphics, and also the ability to distribute information to multiple terminals for high-quality video display over network connections that are not necessarily high-bandwidth, at least not sufficiently high bandwidth to carry conventional rasterized graphics bits at the high frame rate required.

The present invention may be provided via a system including a graphics subsystem for outputting frames of display information including graphics, a first component that provides graphics data at a first rate to the graphics subsystem to output the frames of display information, and a second component that interfaces with program code to produce scene data for the program code, the second component configured to process the scene data into graphics information at a second rate that is lower than the first rate, and to provide the graphics information to the first component.

A method and computer-readable medium having computer-executable instructions may include, at a first component, receiving calls including data corresponding to graphical images for output, maintaining the data as scene information, and at a first operating rate, processing the scene information into graphics information, and communicating the graphics information to a second component. At the second component, at a second operating rate that is faster than the first operating rate and based on a frame refresh rate of the graphics subsystem, the method may include receiving the graphics information, processing the graphics information into graphics data formatted for the graphics subsystem, and communicating the graphics data to the graphics subsystem to output the frame.

One aspect of the present invention is directed towards generating timing intervals for purposes of animation. In general, the high-level component maintains a set of clocks (sometimes referred to as timelines) related to animated objects in a scene, or media such as linear audio and/or linear visual media. The clocks correspond to clock properties received from an application program, and may be hierarchically arranged. The clocks are processed into event lists at the higher level, from which timing interval data is generated and passed (e.g., in data structures) to the low-level component. The low-level component uses the timing interval data to rapidly calculate (e.g., per-frame) values corresponding to animation changes. In general, for any given frame, the lower-level calculates a current progress value for an object being animated, based on a current time within the current interval. From the progress data, one or more property values of the animated object, such as current position, angle of rotation, color, and/or essentially any transformable property, may be rapidly interpolated for the current frame.

Any time that the user or some automated process interacts with the application program in a manner that affects an animation, such as to pause the contents of a displayed window that includes animations, or restart an animation, the higher level component re-computes the event list for the relevant clock and for any child clock or clocks thereof in the hierarchy. This re-computing operation may include adding implicit events to the event list, and/or designating some events as unused. The animation intervals are also recomputed from the event list and sent to the lower-level engine, which in turn consumes these intervals and adjusts each animated object's values accordingly for the display frame being constructed based on the updated animation interval list for that object.

Other benefits and advantages will become apparent from the following detailed description when taken in conjunction with the drawings, in which:

BRIEF DESCRIPTION OF THE DRAWINGS

FIGS. 13-22 comprise data structures and describe other information used to communicate information from the high-level composition and animation engine to the low-level composition and animation engine in accordance with an aspect of the present invention;

DETAILED DESCRIPTION

Exemplary Operating Environment

Figure 1:
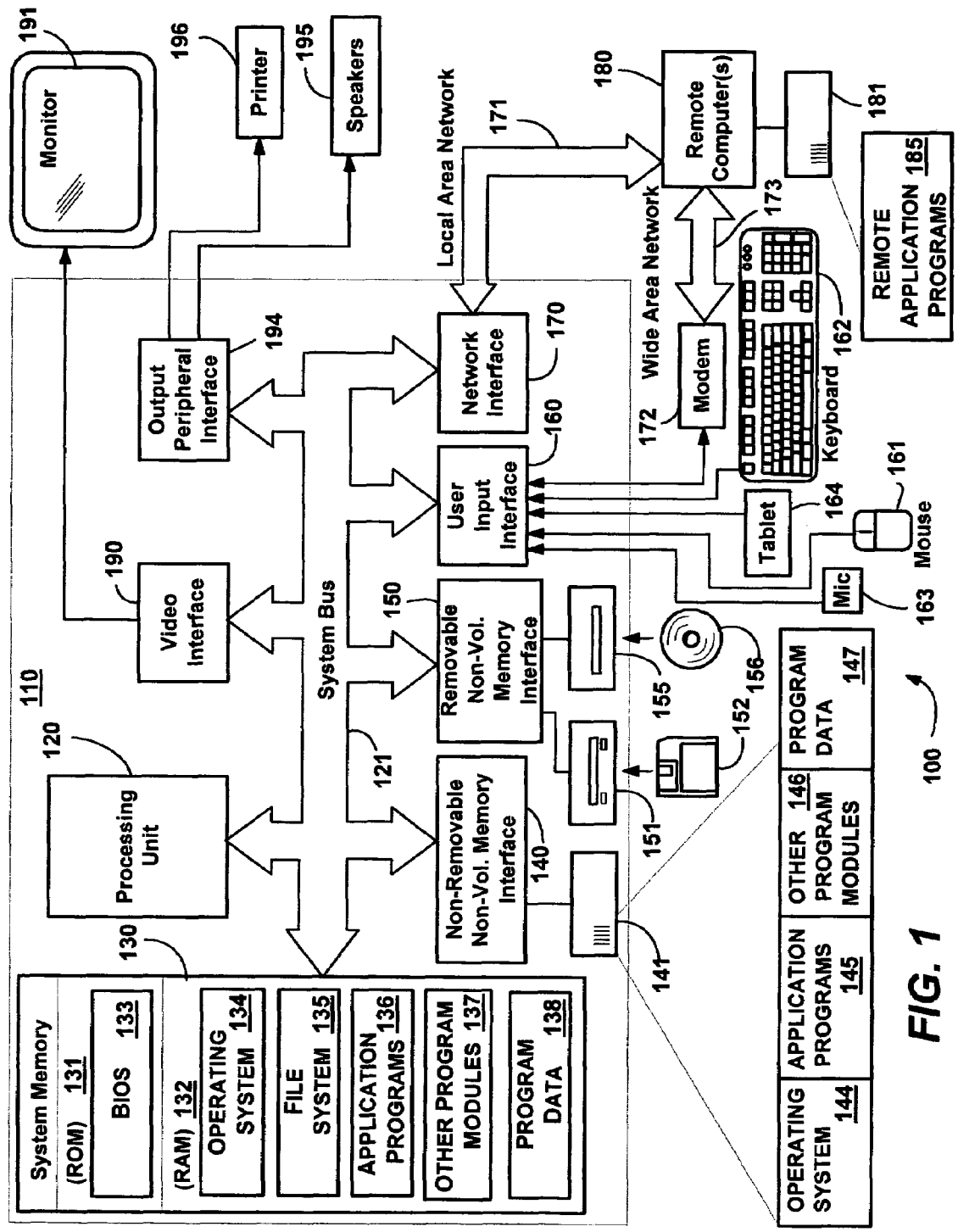
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, file system 135, application programs 136, other program modules 137, and program data 138.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 136, other program modules 137, and program data 138. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Media Integration Layer Architecture

Figure 2:
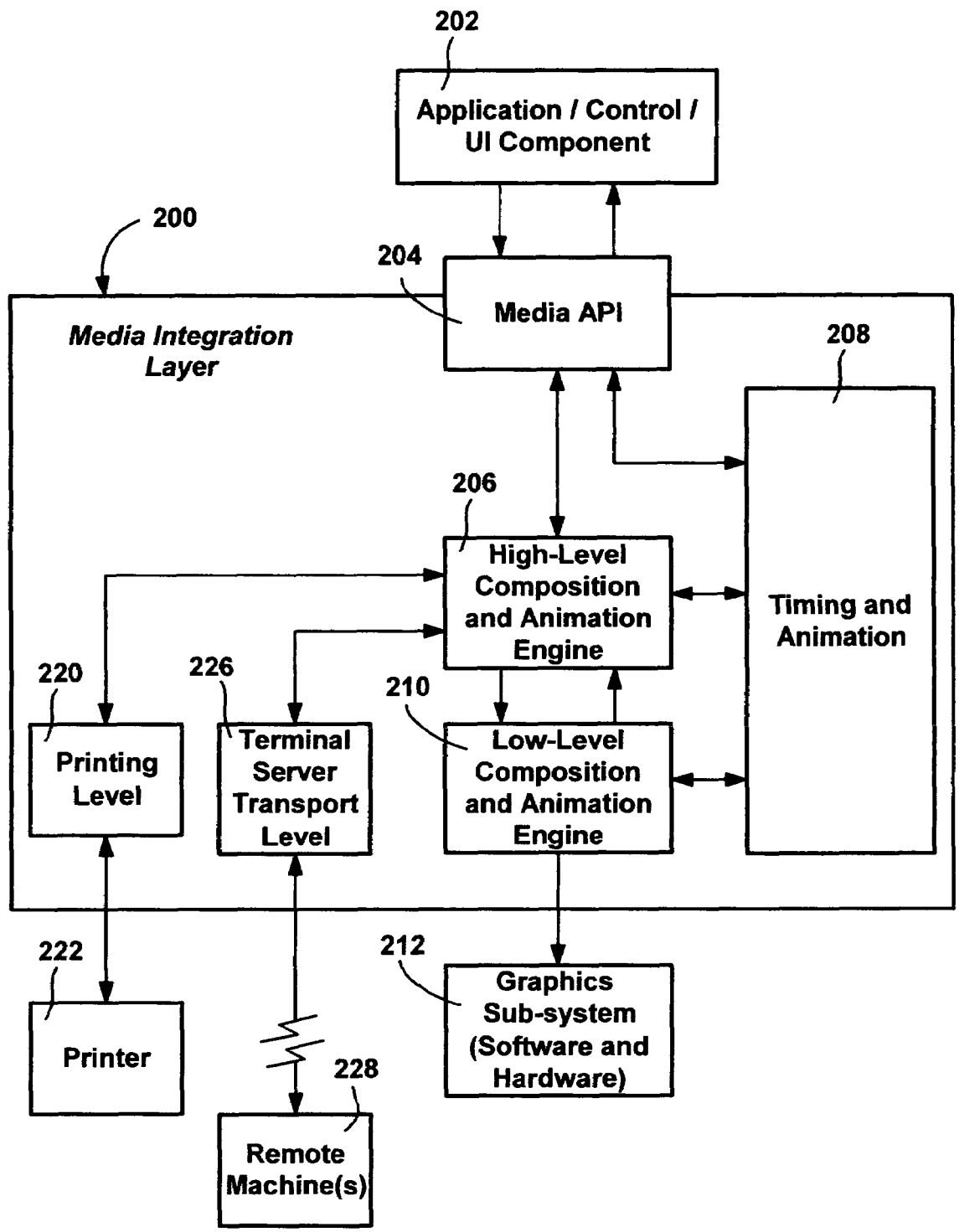
FIG. 2 is a block diagram representing a media integration layer architecture in accordance with an aspect of the present invention.

One aspect of the present invention is generally directed to providing smooth, complex animations on computer systems. To this end, as generally presented in FIG. 2, a media integration layer architecture 200 is provided. An application, control or other similar higher-level program code (e.g., a user interface of an operating system component) 202 accesses the media integration layer architecture 200 via a set of application programming interfaces (APIs) 204 or the like, to access (write or read) graphical information. Note that although many of the examples described herein will refer to an application program interfacing with the APIs, it is understood that other higher-level program code and components (e.g., a user interface of the operating system) will also be able to interface with the lower level components described herein. As such, any reference to such higher-level program code, whether referred to as an application program, user interface, and so on, should be considered equivalent.

It should be noted that for various reasons including security, the media integration layer 200 (which outputs graphics) is preferably incorporated into the operating system. For example, while feasible to allow some or part of the media integration layer 200 to be inserted between the application and the operating system, doing so would enable a malicious program to display whatever graphics it wanted, and thereby cause harm. For example, malicious code could display a dialog box requesting entry of a password to thereby steal a user's password. Other reasons for incorporating the media integration layer 200 into the operating system include stability and efficiency, e.g., the lower levels can efficiently trust that the data and instructions from the higher layers are already verified. Further, the lower levels can expose interfaces that only the operating system is trusted to call responsibly, that is, without exposing those interfaces to unpredictable programs, thereby ensuring greater stability.

In one implementation, the media integration layer architecture 200 includes a high-level composition and animation engine 206, timing and animation components 208, and a low-level compositing and animation engine 210. As used herein, the terms "high-level" and "low-level" are similar to those used in other computing scenarios, wherein in general, the lower a software component relative to higher components, the closer the component is to the hardware. Thus, for example, graphics information sent from the high-level composition and animation engine 206 may be received at the low-level compositing and animation engine 210, where the information is used to send graphics data to the graphics subsystem including the hardware.

As described below, the high-level composition and animation engine (also referred to herein as the high-level compositor and animator or the high-level engine or component) 206 builds a display tree to represent a graphics scene provided by the application program 202, while the timing and animation components provide declarative (or other) animation and timing control. As also described below, the low-level compositing and animation engine (also referred to herein as the low-level compositor and animator or low-level engine or component) 210 composes the renderings for the scenes of multiple applications, and with rendering components, also referred to renderers, implement the actual rendering of graphics to the screen. Note, however, that at times it may be necessary and/or advantageous for some of the rendering to happen at higher levels. For example, while the lower layers service requests from multiple applications, the higher layers are instantiated on a per application basis, whereby is possible to do time consuming or application-specific rendering at a higher levels, and pass references to a bitmap to the lower layers.

In general, the high-level composition and animation engine 206 builds the display structure and traverses the structure creating rendering instructions and simple animation intervals to be passed to the low-level compositing and animation engine 210. The rendering instructions generated by the high level compositor may contain timing and animation information. The low-level compositing and animation engine 210 takes the rendering instructions and animation intervals and manages the animating, rendering and composing the scene that is then provided to the graphics subsystem (e.g., the graphics software and hardware) 212.

Alternatively or in addition to locally displayed output, the high-level composition and animation engine 206 (or one similar thereto) may provide the rendering and animation instructions in an appropriate format to lower-level printing code 220 for sending fixed image data to a printer 222 or the like, and/or may provide rendering instructions and simple animation intervals in an appropriate format to a lower-level terminal transport server 226 for transmission to remote machines 228. Note that richer information also may be passed across the network, e.g., it may be desirable to have the remote machine handle mouse rollover effects locally, without any network traffic.

Multiple Graphics Processing Levels

The media integration layer architecture 200 thus separates graphics processing into multiple levels. Each of these levels performs some intelligent graphics processing which together allows applications, user interfaces and the like 202 to output graphics with smooth animation, composite the graphics with the graphics of other applications and with video frames. The animation and/or compositing may also be synchronized with audio output. For example, by synchronizing audio with the frame rate at the low level component, the timing of audio can essentially be exact with that of video or graphics, and not dependent on the ability of task-scheduled, complex pre-processing to keep up with the refresh rate.

Figure 3:
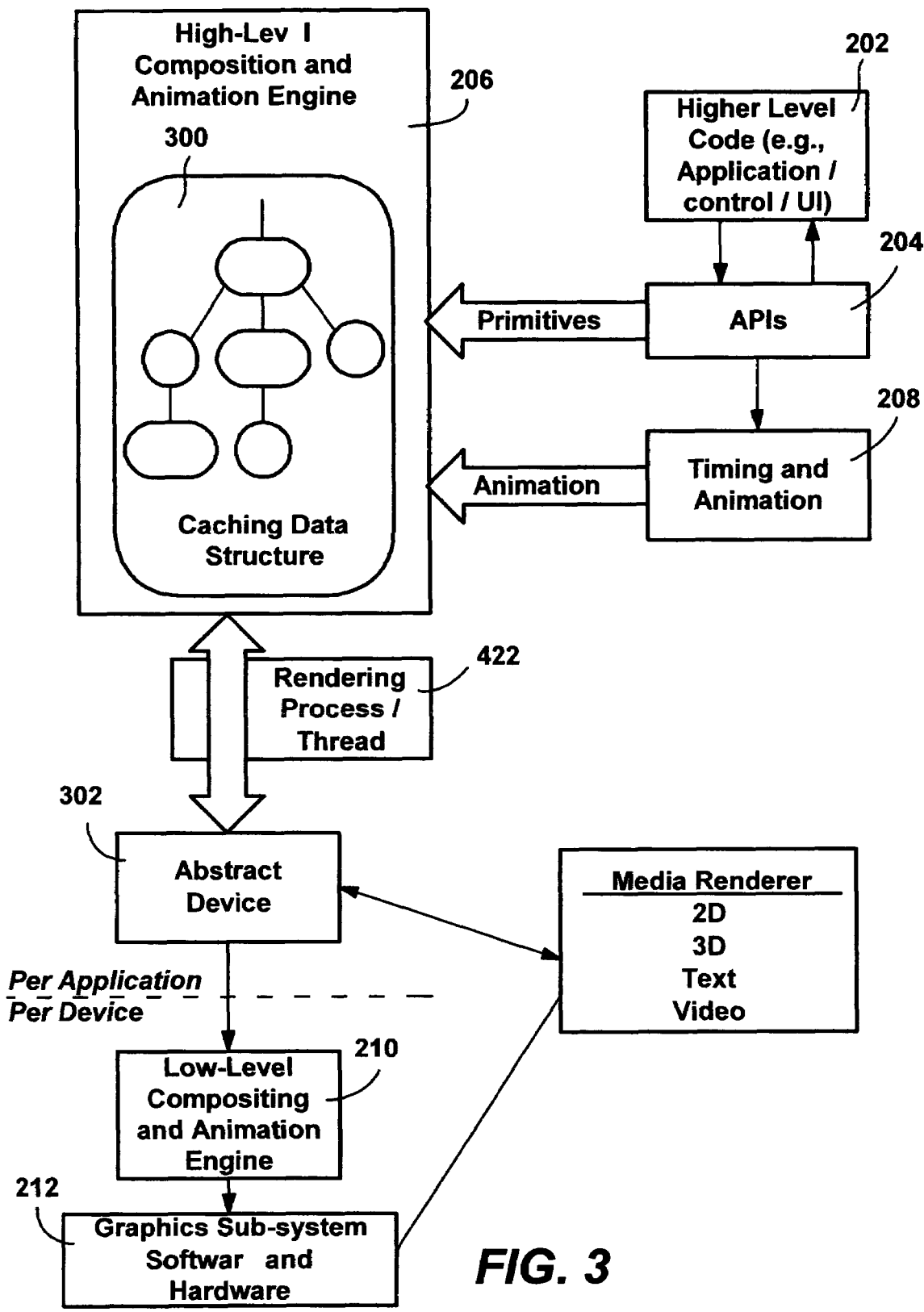
FIG. 3 is a block diagram representing an intelligent caching data structure and its relationship to various components in accordance with an aspect of the present invention.

As generally represented in FIG. 3, below the application 202 as communicated with via the APIs 204, the high-level compositor and animator engine 206 caches the application graphical data in a tree structure 300, pre-processes the data in an intelligent manner, and performs numerous other operations (described below) to facilitate the output of complex graphics. A timing tree comprising clocks is also maintained, as described below with reference to FIGS. 25-30. In general, the high-level compositor and animator engine 206 performs complex processing (sometimes referred to as compiling) that significantly simplifies the amount of processing and significantly reduces the amount of data that lower levels need to deal with to render the correct output. Note, however, that the amount and type of processing that is performed by the higher level may be dependent to a significant extent on the load, configuration and capabilities of the lower levels. For example, if high capability graphics hardware is present, the higher level may do a lesser amount of processing, and vice-versa. The high-level and low-level layers are adaptive to these factors.

In keeping with the present invention, the high-level composition and animation engine 206 can accomplish such complex processing without overwhelming the available system resources because it operates at a relatively slower rate than the level or levels below. By way of example, and not limitation, the lower levels may operate at the frame (refresh) rate of the hardware graphics processor. For example, the high-level compositor and animator 206 may only operate when needed to effect a display change, on demand, or on another schedule (e.g., every half second). Note that while a single high-level compositor and animator engine 206 is represented in FIG. 3, there may be multiple instances of them, such as one per application, while there is typically only one low-level compositing and animation engine 210 per graphics device, e.g., one for each graphics hardware card on a machine.

Moreover, the high-level compositor and animator 206 can tailor its output to (or be designed to output) a format of the appropriate level or levels below, e.g., essentially any abstract device 302. For example, the high-level compositor and animator 206 can produce compiled output that is ultimately destined for a printer, for transmission over a network to a number of remote terminals for display thereon, or, as will be primarily described herein, for a lower-level compositor and animator 210 that is present above local graphics software and hardware 212. A single high-level compositor and animator may process the output of an application for a plurality of abstract devices, or there may be a suitable instance of a high-level compositor and animator to process the output of an application for each type of abstract device, e.g., one for local graphics, one for a printer and one for a terminal server.

Further, the commands and other data provided by the high-level compositor and animator 206 can be simplified to match the capabilities and requirements of the hardware, e.g., the lesser the hardware, the more high-level pre-processing needed. Still further, the amount of high-level pre-processing may be dynamic, e.g., so as to adjust to the varying processing demands placed on the lower level or levels.

For local graphics output, in one configuration the media integration layer architecture 200 includes the high-level compositor and animator 206, and the low-level compositor and animator 210. As will be described below, in general, the high-level compositor and animator 206 performs complex processing of graphics information received from clients (e.g., applications) to build graphics structures and convert these structures into a stream of graphics commands. The low-level engine 210 then uses the streams of graphics commands from various clients to compose the desktop that is viewed by the computer user, e.g., the low-level compositor composes the desktop by combining the command streams emitted by the various clients present on the desktop into graphics commands consumed by a graphics compositing engine. As also described below, the low-level composition and animation engine also maintains interval lists corresponding to animated objects, such that the current display property values (such as current position, angle of rotation, color, and/or essentially any transformable property) of any animated object can be rapidly determined based on the current time relative to the interval data.

In this implementation, the high-level compositor and animator 206 performs the complex processing operations that build and convert the structures 300 into the stream of graphics commands at a rate that is normally much slower than the hardware refresh rate of the graphics hardware of the graphics subsystem 212. As a result of this high-level pre-processing, the low-level engine 210 is able to perform its own processing operations within the hardware refresh interval of the graphics hardware of the graphics subsystem 212. As mentioned above, however, in one implementation the low-level engine 210 can communicate back to the high-level engine 206 over a back channel so that the high-level pre-processing can dynamically adjust to the low-level processing demands. Note that the back-channel from the low-level compositor and animator 206 to the high-level compositor and animator 206 is primarily for communicating flow control (the low-level engine 210 signaling it needs more data or is receiving too much) to the high level engine 206 and/or error conditions actionable by the high level engine 206. One advantage of such communication is that the low-level compositing and animation engine 210 need not be concerned with priorities or scheduling, but can remain in synchronization with the refresh rate. Instead, the high-level CPU process scheduling already present in contemporary operating systems will control priority. Thus, for example, if an application process attempts to take too much of its share of high-level graphics pre-processing relative to its priority, it will be that application that is adversely affected in its output. Note, however, that when the low-level system is under heavy load, it can choose to prioritize the changes and demands of one process/high-level component over another. For example, the foreground application can be given priority.

The High-Level Compositor and Animator

In one embodiment, the media integration layer 200 including the high-level compositor and animator 206 adjusts for hardware differences on a given machine, because each user application cannot realistically be written to handle the many types and variations of graphics hardware. However, applications may also contribute to the improved graphics processing provided by the media integration layer 200, namely by providing more (and different) information to the high-level compositor and animator 206 than that presently passed to an operating system's graphics APIs. For example, applications that are aware of the media integration layer 200 may provide different data, including animation intentions (including clock properties, described below) and the like via the media integration layer APIs 202. By way of example, instead of performing animation by continually redrawing a slightly varied image, the application can provide an instruction as to how a particular image should move or otherwise change over time, e.g., relative to a fixed background. The media integration layer 200 then handles the animation in a smoothly rendered way, as described below.

Figure 4:
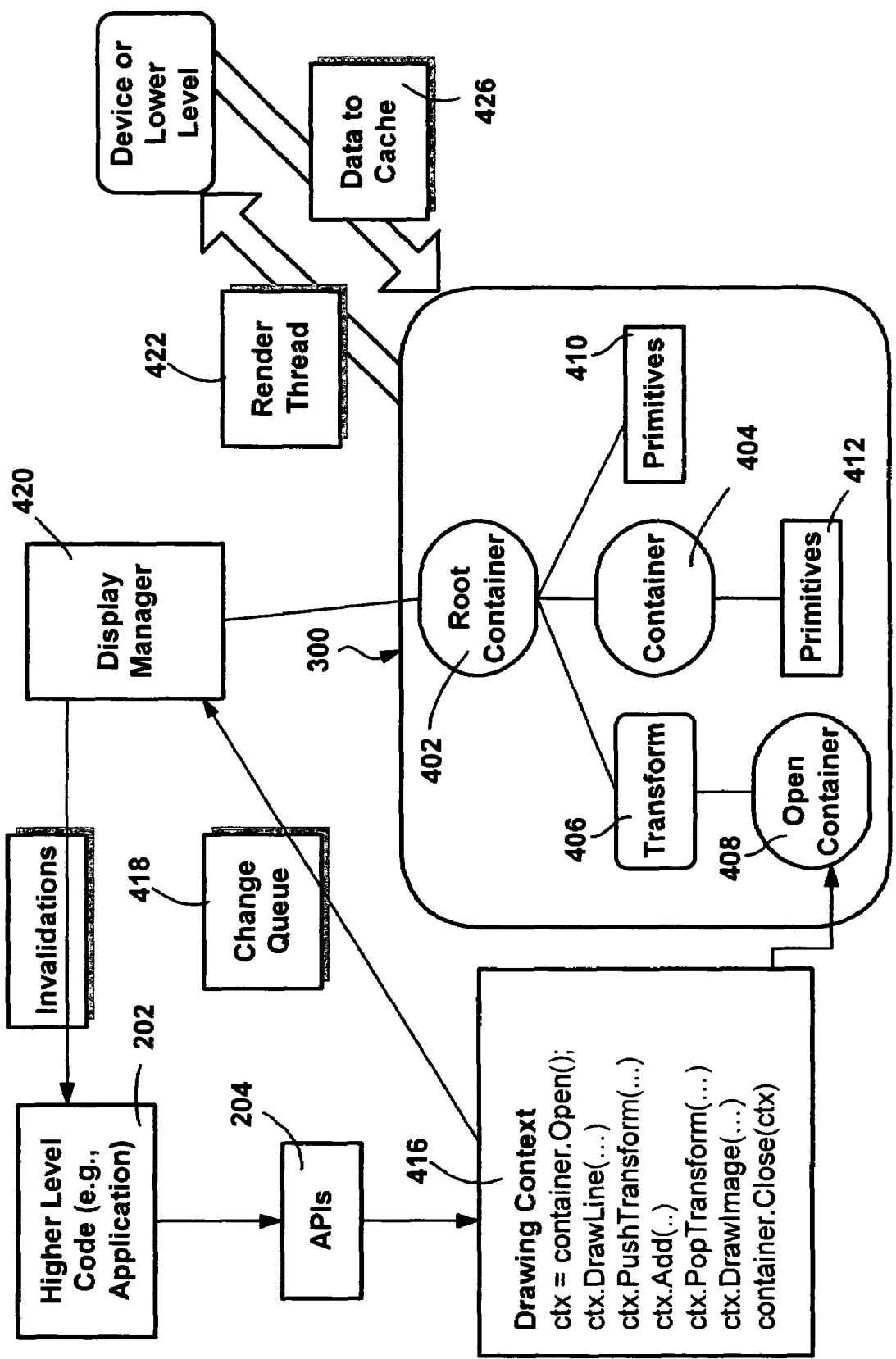
FIG. 4 is a block diagram representing the general flow of control between a high-level composition and animation engine and other levels in accordance with an aspect of the present invention.

In general, as represented in FIGS. 3 and 4, the application 202 builds a scene graph data structure via APIs 204. The data includes high level structure and primitive data, and is put into a cache data structure 300 that is used to intelligently cache visual information.

One of the objects (or structures) in the overall intelligent caching data structure 300 is a container, represented in FIG. 4 by containers 402, 404 or 408, (alternatively referred to as a Visual2D). In one implementation, a container (e.g., 404) provides identity in that an application can hold a handle to it, and includes procedural parameters which can be used for hooking up animation and templating, hit-testing and user data. Note however that the containers represented herein are not the only types of containers that might be exposed. Other examples may include containers that are optimized for storing lines in a paragraph or for storing many children in a grid. Children containers may be added and removed without clearing the current list of children, although certain types of containers may not allow random access to the children. The structure exposed through the API can be adapted as needed.

Other (internal) nodes of this data structure include transforms 406, alpha nodes, cache nodes, and primitive nodes 410, 412, used to store internal data not directly associated with an API container. Primitives are generally stored as a stream of instructions that can be passed directly to the graphics device.

Figure 5:
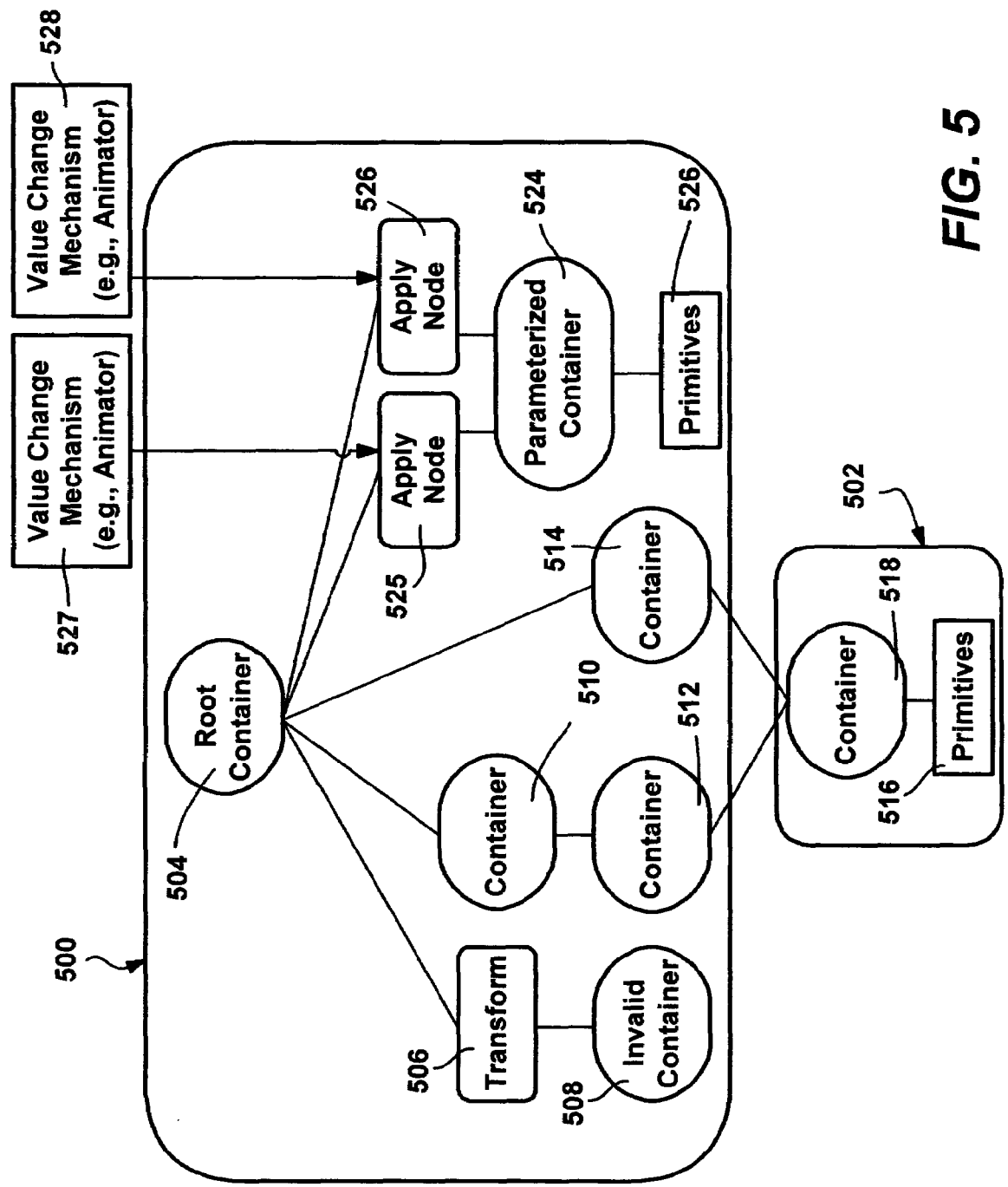
FIG. 5 is a block diagram representing example containers and other nodes cached in a simple data structure and their relationships in accordance with an aspect of the present invention.

As represented in the tree segment 500 of FIG. 5, a container such as 510 can thus hold other containers 512 or drawing primitives 516, wherein storage of the primitives inside of any container can be considered a stream of graphics instructions. A container can also store other containers, in effect creating a graph, i.e., containers can be referenced by more than one container so that the data structure is a directed acyclic graph (DAG) of containers and lists of primitives (wherein no container can contain one of its parent containers). As also represented in FIG. 5, by allowing trees to reference other trees in a graph-like way, any of the containers, such as the container 518 in the tree segment 502 may be reused in different places, yet with different parameters.

A container is populated via an open/close pattern, such as generally represented in the drawing context 416 of FIG. 4. More particularly, the higher level code 202 opens a container 408 in the data structure, provides the drawing context 416 to write drawing primitives and/or add other containers into the data structure, and then closes the container 408. In one alternative implementation, when the container is closed, its data is put into a change queue 418 that is then applied at some later time. The opening and closing of containers is one of the main mechanisms for changing the data structure. Note that other usage patterns may be employed, particularly for different types of containers.

In this alternative, because the changes to the data structure are put into a queue, a transaction-like (or batch-like) system for updating the data structure is enabled. As a result, when opening and writing to a container, no changes are apparent on the screen until the container is closed. The changes to the screen are atomic and there are no temporal artifacts (also referred to as structural tearing) of a partially drawn screen. Further, such transactional behavior can be extended so that changes to multiple containers are applied at once. In this way the higher level code 202 can set up many changes to a scene and apply those changes all at once.

In one alternative implementation, changes to the data structure are made asynchronously by posting changes to the queue 418 via a display manager 420, such that the changes will be processed on a rendering thread 422, and for example, sent to the low level compositor and animator 210, (wherein the abstract device 302 of FIG. 3 comprises the abstraction that encapsulates the conversion of rendering commands issued by the high level compositor 206 into rendering commands streamed to the low level compositor 210). The transaction-like model also enables modifications to the data structure to be made without interrupting reading from the data structure. Although the above-described queue model enables the read passes from the high-level engine 206 to run independent of any actions that the user takes, user applications need the cache to maintain a consistent view of the APIs, which may lead to inefficiencies. By way of example, consider a user application on the main user thread setting a property on a container (object in the high-level engine 206). In the queue model, this property gets put into a queue to be applied to the high-level engine 206 data structure. However, if the user application tries to immediately read back that property from the container, the system will need to read the property back based on what is currently in the queue (which is inefficient), synchronize with the rendering thread and apply the pending changes in the queue (which is inefficient and would negate the benefits of having the queue), or keep copies of user changeable data, both the render version and the pending version, on the container (which is an inefficient use of memory).

Because there may be a considerable amount of reading back by applications, an alternative implementation essentially eliminates the queue by synchronizing the updating of the high-level engine 206 data structures and the main user thread. Although this enables the user application to freeze the rendering, the overall system is more efficient. However, to mitigate the perceived effects of possible freezing, various parts of the animation and timing system may be run independently to communicate information down to the low-level engine 210, while trusting the low-level engine 210 to do more animation processing independent of the high-level engine 206. Then, if the high-level engine 206 is frozen because of a user action, the output to the screen will still be relatively smooth and consistent.

Yet another alternative is to eliminate the render thread, and have the main user thread perform any processing necessary for the high-level engine 206 to pass the rendering instructions to the low-level engine 210. This is a more efficient use of threads in some cases.

Returning to FIG. 4, the container 408 comprises a basic identity node that contains drawing primitives, while the draw context 416 comprises a graph builder (e.g., a helper object)

obtained from a container that can be used to add primitives, transforms, clips or other drawing operations to the container. The display manager 420 comprises a hosting object that represents an instance of the high-level compositor and animator 206, and for example, can attach to an hwnd (handle to a window) or an hvisual (handle to a visual container). The display manager 420 has a pointer to the root container 402 for the scene, dispatches events to the high level code when containers are invalid and need to be redrawn, and provides access to services such as hit testing and coordinate transforms.

Although the higher level code 202 can hold a handle or the like to some of the objects in the data structure and containers, most of the objects in the container do not have an identity from the perspective of the application. In particular, access to this structure is restricted in that most usage patterns are "write only." By limiting identity in this manner, more of the information stored in the data structure can be optimized, and the higher level code 202 does not have to store object information or deal with managing the objects' lifetimes.

For example, the resources that maintain part of the graph that is not needed (e.g., corresponds to visual information that has been clipped or scrolled off the screen) may be reclaimed, with the application requested to redraw the scene if later needed. Thus, generally when a container is opened its contents are cleared and forgotten. If those contents do not have identity, then they may safely disappear so that the resources for them can be reclaimed by the system. If the higher level code 202 or some other part of the graph is holding on to child containers, those containers stay around and can be reinserted. However, this pattern can be changed and adapted depending on the needs of the higher level code 202.

Thus, to summarize, the container is an object that has identity in that the high level code using the data structure can hold a handle to that object. The opposite of an object with identity is plain data, and while the user code may employ a mental model that treats the data without identity as an object, once this data is committed to the system there is no way to later reference that object. In this manner, the object can be transformed and changed in ways that are convenient to the system.

As a simplified example, an API function for drawing a line of text might include a TextLine object. The user of this object would prime the TextLine object with the actual text to be drawn, along with the other information on how to render different runs of that text (font, size, brush, and so forth). When the user program code wants to actually add that line of text to the data structure, the program code may take a drawing context for a particular open node, and pass the TextLine object into a drawing function on the drawing context. The system in effect takes the data that is in that TextLine object and copies the data into the data structure. Because this data does not have identity, the high-level compositor and animator engine 206 is free to take the contents of that line, run algorithms (e.g., OpenType) to break the text down to glyphs with positions, and store the positioned glyph data instead of the raw text. After that line was drawn the system would have no reference to the TextLine object that was used to draw the line, i.e., the data that the system stores does not have any identity.

Alternatively, the higher level code 202 may request that identity be preserved on that TextLine object, requiring the storing of a reference to that object in the data structure. In this manner, if the higher level code 202 later changes the TextLine object, the system will discover that change and reflect it in the rendered output. Note that in a more realistic example, identity would not be exposed on the text line object itself, but rather the application would hold a handle to a container and make changes as desired by parameterizing that container, as described in the aforementioned U.S. Patent Application entitled "Generic Parameterization for a Scene Graph." Nevertheless, one of the main aspects of the data structure is to reduce the need for the higher level code 202 to create such objects with identity, whereby a reduced number of points in the data structure will be referenced by the controlling code 202. This enables more optimization of the data structure.

For example, because of the reduction in the amount of identity exposed outside of the data structure, an optimization such as the dense storage of primitives is enabled. To this end, vector graphic data is stored in a "primitive list" or primitive container. These containers are implementation specific and are not exposed with identity to the higher-level code 202. When the caller writes data into a container, that data is either stored in separate objects that are linked in, like the containers, (e.g., with transforms), or can be streamed into a packed and flattened data array. This array may not only store the vector graphic data in a compact way, but may also track the resources that go along with those primitives. Because the individual primitives do not have identity, there is no need to separate the primitives out or provide a way for the user to change those primitives later, enabling more efficient storage of the primitives.

As another optimization, when a subgraph is not changing, it is possible to store a bitmap of the contents of that tree, and attach the bitmap to a container, thereby reducing the amount of high-level processing needed. Further, when a subgraph or part of a primitive list requires significant processing before it can be passed to a lower-level code for rendering, (e.g. tessellation of vector graphics before being handed off to a hardware device), the post-processed result may be cached for later reuse.

Moreover, since there is no exposure of the structure except for specific read operations (described below), the data structure is free to reorganize containers so long as the rendered result is the same. A container may therefore store the child containers in a space partitioning tree to optimize rendering and other read operations. Further, the data structure may be displayed multiple times on the same device or on multiple devices. For this reason the caches may be keyed based on device if they are device dependent. If a subtree is recognized as being static, repainted often because of animations around it and yet is dense enough to warrant the resource drain, a cache node may be automatically inserted for that sub-tree.

For rendering, the data structure is read (either at some scheduled time or by a different thread) and processed information of some form is passed to the lower-level animator and compositor 210. To this end, in one alternative implementation, a render object and thread (per process) 422 traverses the data structure 300 to drive the render process. In another alternative, instead of running on its own thread, the render process may share time on a common thread with the rest of the user's code in a type of "cooperative multitasking" arrangement. The data structure 300 can be used for direct rendering, although preferably it is compiled into the visual information that is fed to the lower-level components for very fast compositing and animation. The data structure 300 can also be compiled in different ways, such as to be sent across a network to a remote terminal, to a printer and/or serialized to disk or some other more permanent storage medium for interchange or caching.

In one alternative implementation, the data structure 300 is read for rendering on another thread 422. However, it should be noted that the use of another thread is not a requirement, e.g., the "render thread" may alternatively comprise a cooperative sharing mechanism that runs on the same thread as everything else.

In the alternative model that uses a rendering process/thread, the rendering thread runs as needed to provide the intended effect. Each time the thread runs, it first applies any pending changes that are in the change queue 418. The render thread 422 then walks the data structure 300 to collect information such as bounding boxes and collect invalidations (described below). Lastly it walks the areas that have changed since last time or need to be rendered for some other reason, and executes the rendering instructions that are stored in the data structure. Note that in the alternative model that does not use the change queue, changes are applied directly, as they are being made, and thus do not need to be applied here.

Thus, rendering from the data structure 300 is a multiple pass process which may run on a separate render thread 422, including a pass that applies queued changes made to the data structure, a pass that pre-computes including iterating the data structure and computing data required for rendering such as bounding boxes, animated parameter values, and so forth, and a render pass. The render pass renders using the abstract device 302 that will ultimately delegate to the low-level compositor and animator 210. During the render pass, intermediate cached resources 426 can be cached in order to improve rendering performance on subsequent frames.

Possible results of the last walk of the data structure include that the data is executed directly and displayed on the screen, or executed on a back buffer that is flipped at the end of the last walk. Other results include the data being brought together with extended timing and animation information (as described below) and passed down to a rendering thread/process that runs much more frequently. The walk may also result in data being executed onto a bitmap for a screen capture or other reasons, directed to a printer, or directed across a network and then used for any of the previous reasons on the remote machine. A combination of these results is also possible.

As can be appreciated, storage of the data in the data structure 300 may require a large amount of memory. Further, much of the data in the data structure 300 may not be needed because it is not visible, due to clipping, scrolling or other reasons. To reduce resource demand, the data structure 300 can be built on demand. To enable this, there is provided a method for calling back to the higher level code 202 in order to create portions of the data structure 300 as needed. This method has been referred to as "invalidation" and is similar to the WM_PAINT callback method used in conventional graphics systems but applies to the structure 300 and cached contents instead of applying directly to bits on the screen. However, in one queue model alternative, read operations (like hit testing and coordinate transformation, described below) apply changes first, so the model presented to the user is synchronous.

Containers can be made invalid when they are created, when content is thrown away by the system because of low resources, or when the higher level code directly requests for the container to be made invalid. For example, the higher level code 202 can create a container, and provide a graphical size defining where and how big that container is to be. During a render operation, if that container was marked as invalid but is now determined to be needed, the render thread 422 will ask the higher level code 202 to fill in the container. The render thread 422 can wait for the higher level code 202 to complete the request, or continue the render without the data that is needed. The first option is not ideal, but may be necessary under some circumstances.

When the data is eventually filled in, the render thread 422 will run again to display those new changes. In one current implementation, the request to fill in a container is placed in another queue to get back to the thread running the higher-level code 202. However this may be done other ways, including a synchronous call to the higher level code 202 on the same thread on which the renderer is running. However, making any such call synchronous will stall the rendering thread.

In addition to queuing updates to the data structure 300, there is a need to provide for services to read back from the data structure 300. Such services include hit testing, point transformations and subgraph sizing.

Hit testing is a process whereby a point is given in the coordinate space of some root of the data structure, and the data structure is probed such that the containers or primitives that are hit by that point are returned. In a current implementation, the hit testing process is controlled by the values of three flags stored on each container, (although additional flags are feasible). A first flag includes a setting that instructs the hit test algorithm to stop and return the hit test results collected thus far. A second flag includes a setting that tells the hit testing algorithm to include that container in the result list if the point being hit does indeed hit that container. A third flag controls whether or the children of that container should be hit tested against.

Another read service is point transformation, wherein given two nodes connected through the graph, there is a service whereby a point in the coordinate frame of one container can be converted to the coordinate frame of another container. There are three general subtypes, including transforming from an ancestor to a descendent, from a descendent to an ancestor and from peer to peer (any arbitrary node to any other arbitrary node). The read service thus provides a way to query the data structure for coordinate transforms, and leverages the tree architecture to walk up and compute the transform. Animation/changes may be locked while doing multiple transforms, and performing transforms through a common ancestor may be provided.

Another read service is subgraph sizing. Given a node, this service returns the graphical size of that node and its subgraph. This may be in the form of a size that is guaranteed to be large enough to contain the subgraph, some perhaps different size that is just large enough to contain the subgraph, or a more complex shape detailing the contours of the subgraph.

An implementation may want to synchronize these read operations with changes to the data structure. To this end, if the change queue is applied before any of these read operations are called, a more consistent view is presented to the higher level code.

The Low-Level Compositor and Animator

Figure 6:
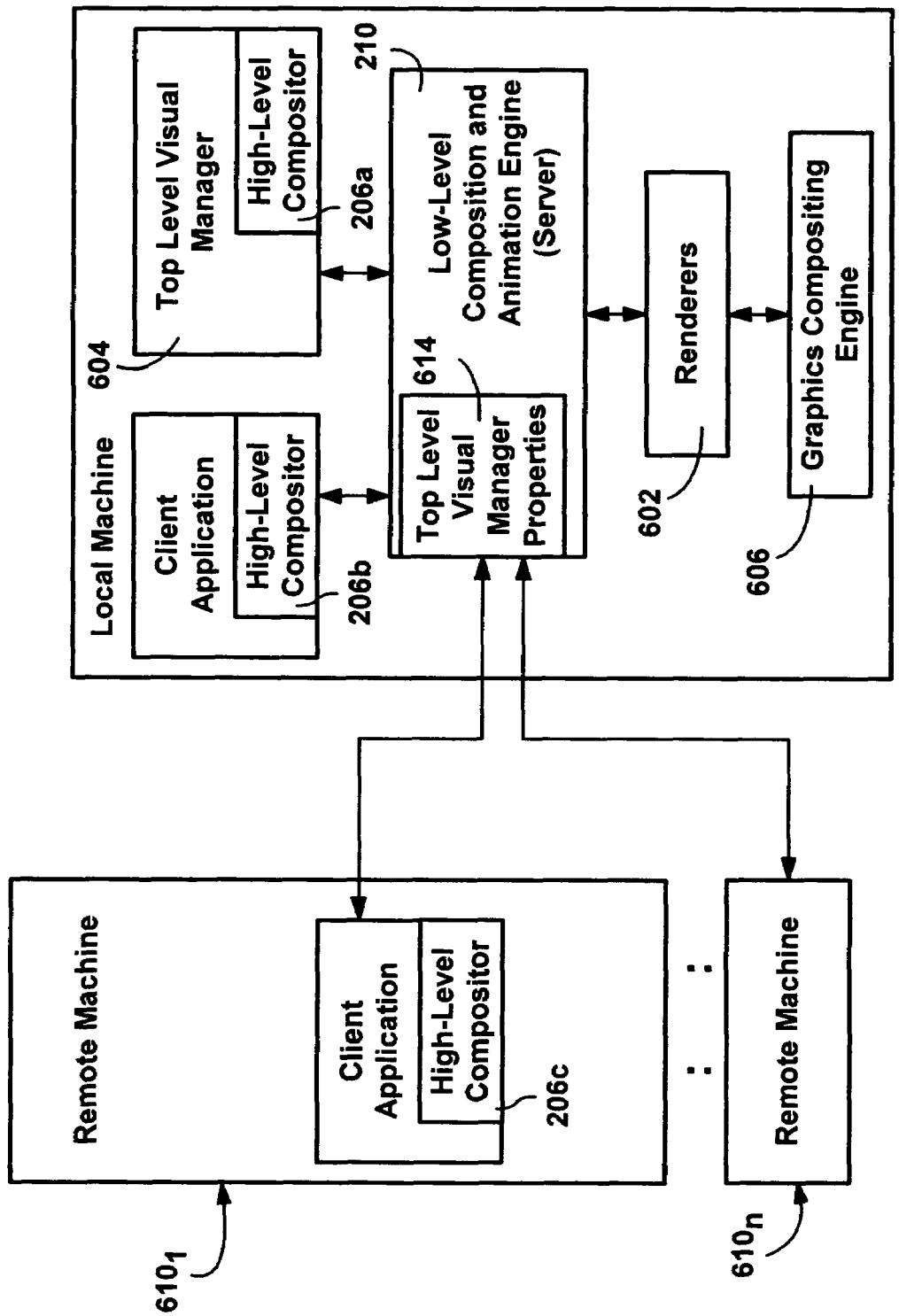
FIG. 6 is a block diagram representing general components of a low-level composition and animation engine interacting with other components in accordance with an aspect of the present invention.
Figure 7:
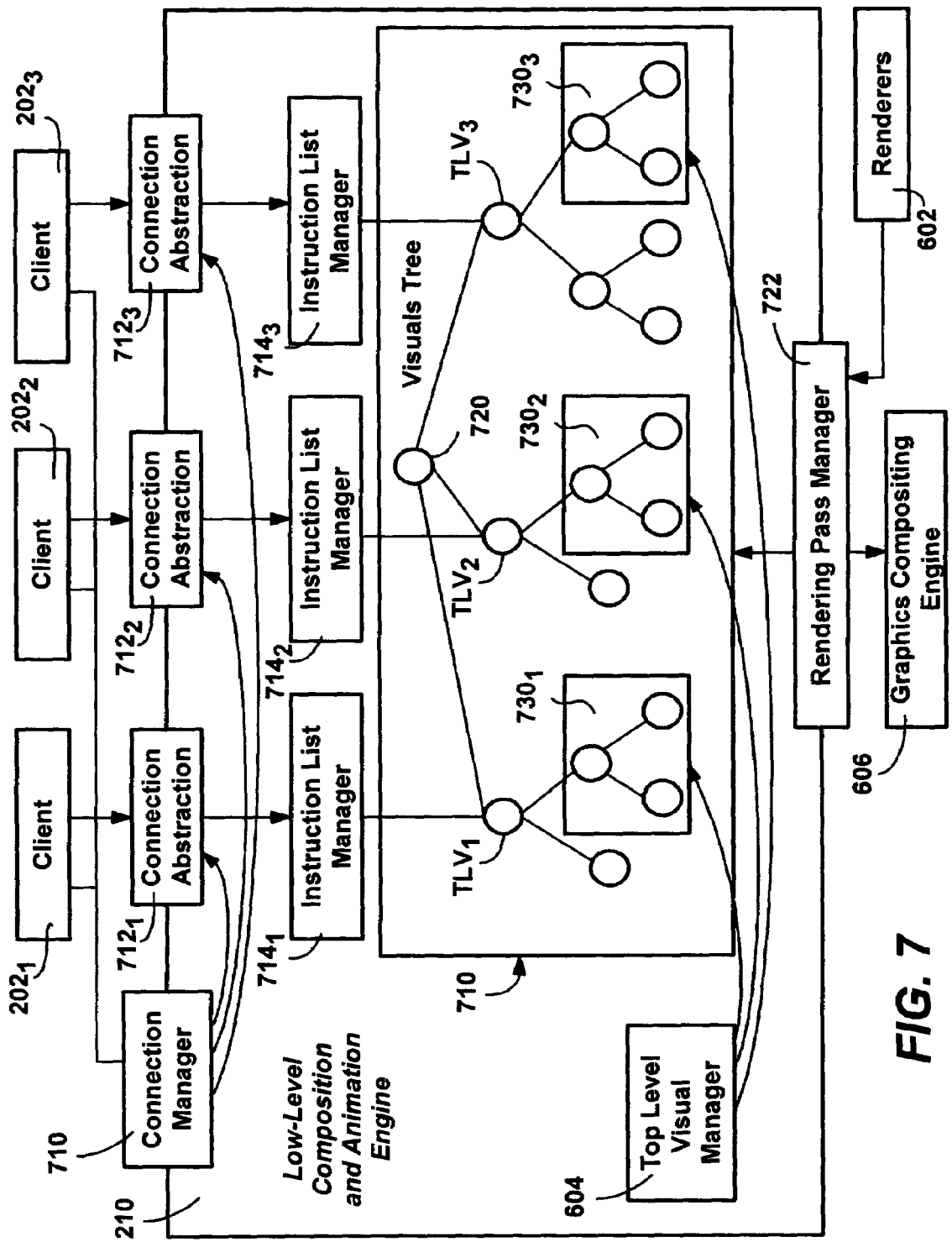
FIG. 7 is a block diagram representing general components of the low-level composition and animation engine in accordance with an aspect of the present invention.

A primary purpose of the low-level animator and compositing engine 210 is to provide an abstraction of the low-level rendering stack of the media integration layer 200, which allows for (1) high frame rate animation for client graphics applications, (2) the implementation of window management-like support, and (3) support for remoting graphics services over a network connection. As represented in FIGS. 6 and 7, the low-level animator and compositing engine 210 acts as a server to, among other things, coordinate high frame rate animation requests received from multiple clients (e.g., corresponding to multiple applications with respective high level compositors), by using services provided by a collection of renderers 602. The renderers 602 generate rendering actions that act on rendering abstractions (also referred to as visuals) implemented by a graphics compositing engine 606.

The low-level animator and compositing engine 210 also provides top level visual management support, comprising infrastructure aimed at allowing a special client (a top level visual manager 604) to manipulate visuals used by client applications as rendering areas on the screen. Each of the client applications $202_1$-$202_3$ (only three are shown in FIG. 7, but there may be any number) rendering to the rendering stack owns a top level visual ($TLV_1$-$TLV_3$, respectively), and the top level visual manager 604 is a client that has authority over the layout of top level visuals on the screen. In general, the low-level animator and compositing engine 210 composes the desktop by combining command streams emitted by the various clients present on the desktop into graphics commands consumed by the graphics compositing engine 606. The low-level animator and compositing engine 210 also helps the components that use it to implement a rendering architecture that makes programming user interfaces for remote machines $610_1$-$610_n$ the same as for local machines.

FIG. 7 shows the interaction between the low-level animator and compositing engine (server) 210 and its clients. As described above, the top level visual manager 604 is also a client. As also described above, clients $202_1$-$202_3$ of the low-level animator and compositing engine 210 use an instance of a high-level compositor and animation engine 206 to build graphics structures and convert these into a stream of graphics commands that the low-level animator and compositing engine 210 uses to compose the viewed desktop. In one embodiment, there is only one low-level animator and compositing engine 210, handling command streams issued by clients (e.g., high level compositors) running on either the local or a remote machine.

Returning to FIG. 6, interprocess communication may be performed via a property system 614 maintained by the low-level animator and compositing engine (server) 210. Properties associated with each top level visual are stored by this property system 614. Clients can write and read these properties, and clients can be notified on request of changes to property values.

The low-level animator and compositing engine 210 provides client-server communication, fast animation rendering, and top level visual management support. In one implementation, communication between the low-level animator and compositing engine 210 and clients occurs via a single bidirectional byte stream and/or shared memory. For the byte stream, local clients use interprocess communication, while remote clients open a network byte stream connection. The byte stream is a transport layer for a communication protocol that controls client server interaction.

The communication protocol includes three primary messages, namely request, reply and event messages. Error messages are also provided. The client-to-server communication primarily comprises rendering instructions, while the server-to-client communication is primarily feedback, in the form of responses and error messages, as described below.

A request is generated by the client to the server, and may include top level visual management commands, rendering instruction commands and timing interval commands. A reply may be sent by the server to the client in response to a request. It should be noted, however, that not all requests are answered with replies; replies are generated only in response to appropriate requests that seek information. For example, draw instructions do not need a reply. However, a "Get window size" request needs and receives a reply.

An event is sent from the server to the client and contains information about a device action or about a side effect of a previous request. For example, the server can communicate an event message to the client for resource invalidation, and also to inform the client of a target frame rate. The ability to communicate target frame rates enables variable frame rates, which is desirable because it ensures a consistent frame rate, rather than a high frame rate.

Errors may also be sent to the client. An error is like an event, but is generally handled differently by the client, e.g., to compensate for the error.

Before a client can use the services provided by the low-level animator and compositing engine 210, the client first establishes a connection to the engine 210, via entry points provided by a connection manager 710 (FIG. 7). The connection manager 710 allocates a communication object (e.g., $712_1$) that encapsulates the bidirectional byte stream transport layer for the client server protocol. It also allocates an instruction list manager (e.g., $714_1$) which keeps track of rendering instructions coming over the instruction stream and associates them with the correct visual.

Once a connection is established, the client 202 requests the creation of a top level visual. In response to the request, the low-level animator and compositing engine 210 creates the top level visual (e.g., $TLV_1$) by using services provided by the graphics compositing engine 606. The visuals maintained by the low-level animator and compositing engine 210 for its clients are organized in a tree structure 718. When a client is done with the top level visual, it requests its destruction. Note that a root node 720 is a special visual representing the background of the desktop, and the children of the root visual are top level visuals.

As represented in FIG. 7, one significant role of the low-level animator and compositing engine 210 is to manage the rendering to the computer desktop, which is accomplished by relying on the services of two other components, namely the graphics compositing engine 606 and a collection of renderers 602. The graphics compositing engine 606 provides low-level compositing services via rendering abstractions referred to as visuals. A visual is a rectangular rendering area that gets composed into the desktop and which can be rendered via a set of APIs supplied by the graphics compositing engine 606. When it is time to compose the desktop, a rendering pass manager 722 traverses the tree from left to right and for each node uses the rendering component to render to the visuals.

In addition to lifetime management of top level visuals, the low-level animator and compositing engine 210 also supports top level visual adornment, essentially adding decorations around the top level visuals. Adornments $730_1$-$730_3$ are visuals that render decorations supplied by the top level visual manager in the form of rendering instruction lists. These visuals are children of the top level visual to which they belong. The client (e.g., application) can control adornments provided by the top level visual manager by setting pre-defined properties on the top level visual.

The low-level animator and compositing engine 210 also supports minimizing services for top level visuals, which can also be supplied by the top level visual manager 604 in terms of rendering instruction lists. Top level visual positioning, sizing and Z-order are supported, as well as three-dimensional effects specified for visual manager actions, like visual close and minimize. Thus, although the implementation is primarily described with respect to two-dimensional graphics, the system can be easily used for storing other types of media including three-dimensional graphics, video and audio.

As described above, the rendering instruction lists that the top level visual manager needs are generated by a high-level animator and compositor 206. The low-level animator and compositing engine 210 defines a set of top level visual actions that have default behaviors, such as minimize or close.

If the top level visual manager 604 wants to customize such a behavior, it uses the high-level APIs to build a description of the action it wants to replace. It then sends the instruction stream for the action across to the low-level animator and compositing engine 210. The low-level animator and compositing engine 210 stores this description in its property system 614 and uses it when the client requests the specified action.

Top level visual decorations are performed with the use of the property system 614. At startup the top level visual manager sends instruction lists, generated with the high level engine 206, describing top level visual manager decorations. Updates to these decorations are done through the property system 614, i.e., when the client wishes to update a decoration, the client sets a named property to the desired value. The low-level animator and compositing engine 210 then notifies the top level visual manager 604 that a property has changed. In response, the top level visual manager 604 reads the property and updates the geometry on the low-level animator and compositing engine 210.

As further described in the aforementioned U.S. Patent Application entitled "Generic Parameterization for a Scene Graph," the instruction lists are parameterized, which generally means that the top level visual manager 604 does not need to be involved in simple changes, such as modifying the color of a graphical image. In such cases, the client instead sends down a new parameter (e.g., the new color), and the decoration is re-rendered with the same instruction list, but using the different parameter. This also provides the ability to store only one copy for each decoration description.

Figure 8:
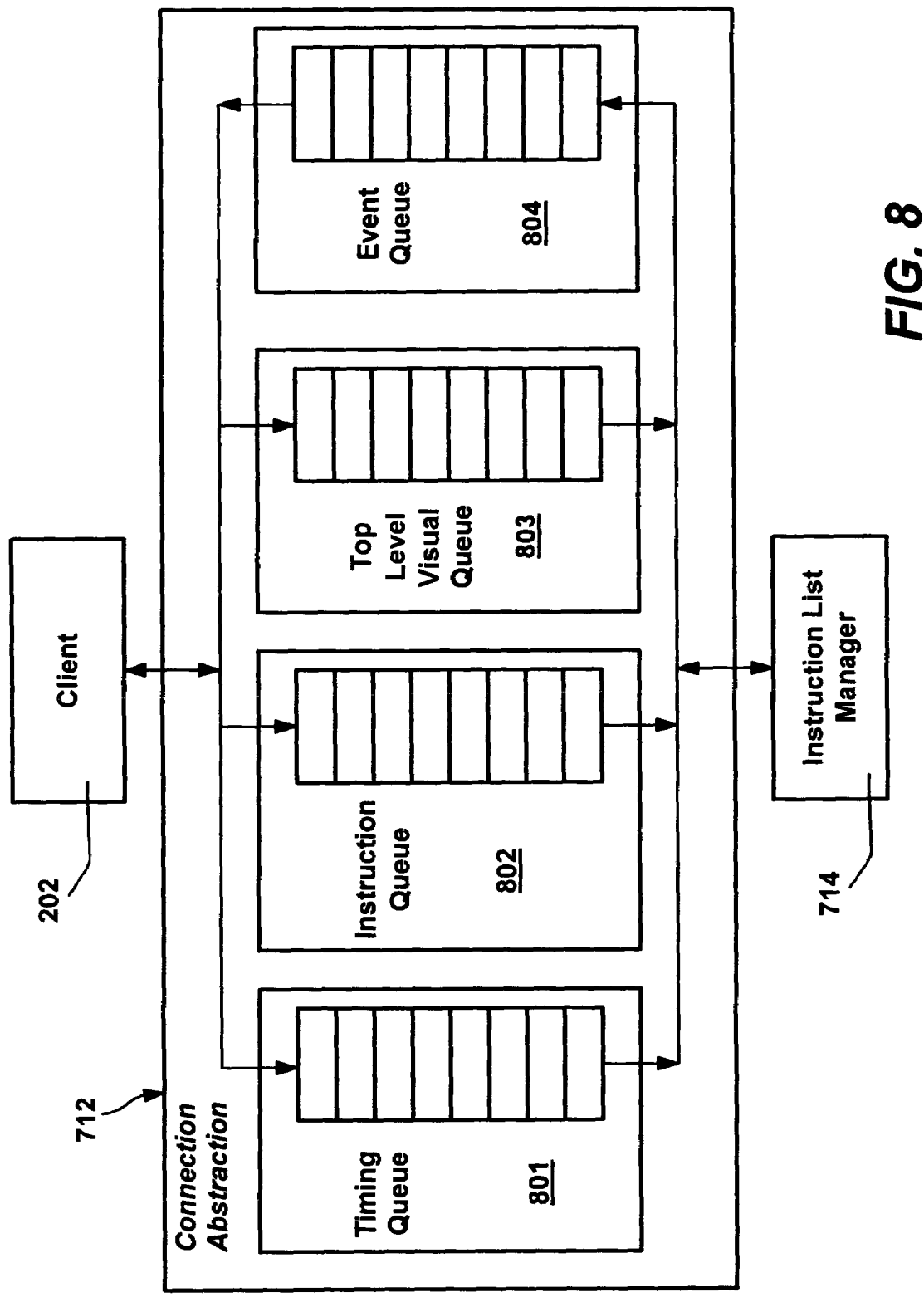
FIG. 8 is a block diagram representing logical structure of a connection to the low-level composition and animation engine in accordance with an aspect of the present invention.
Figure 9:
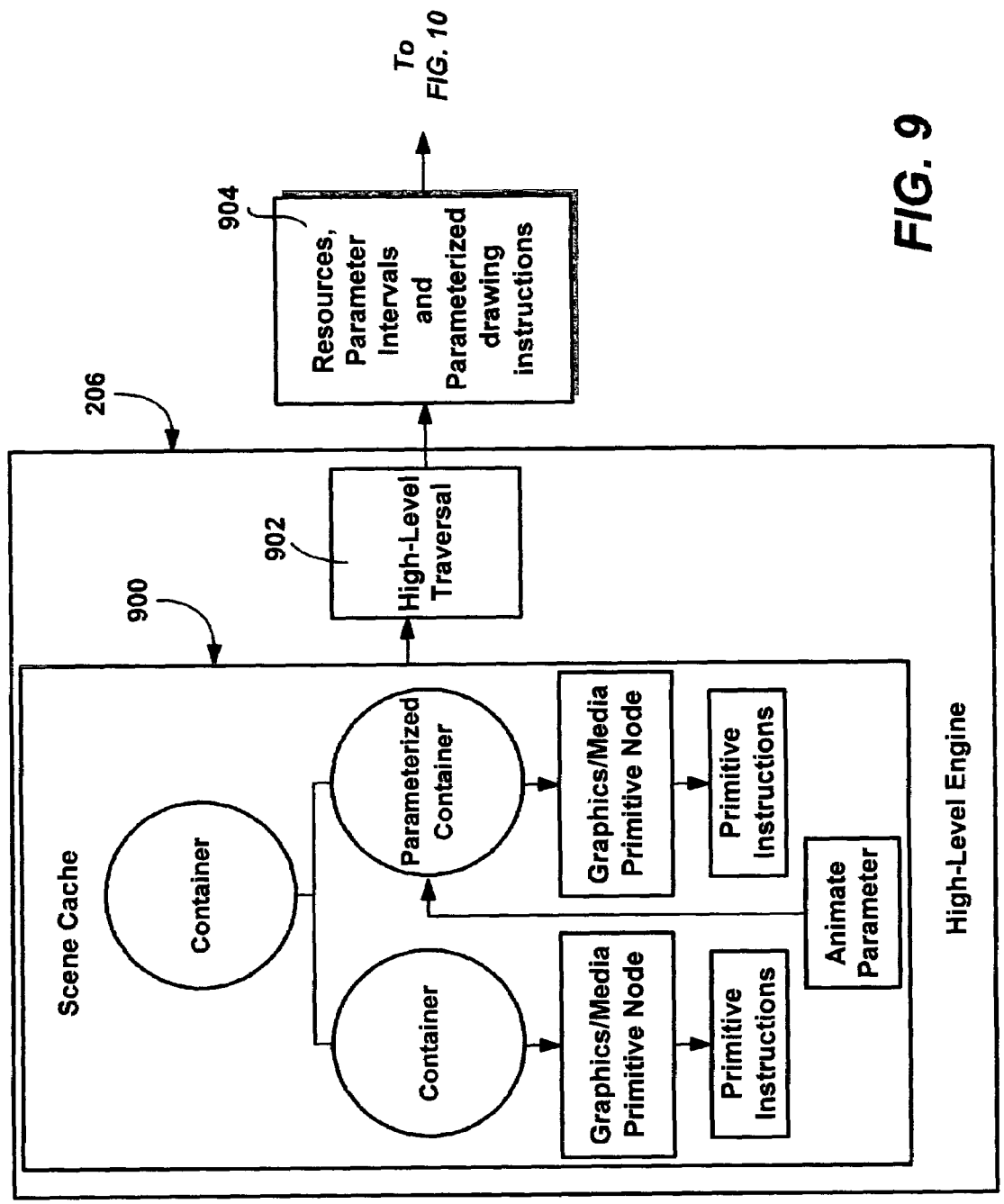
FIGS. 9 and 10 comprise a block diagram representing the flow of information from a high-level composition and animation engine to the low-level composition and animation engine in accordance with an aspect of the present invention.
Figure 10:
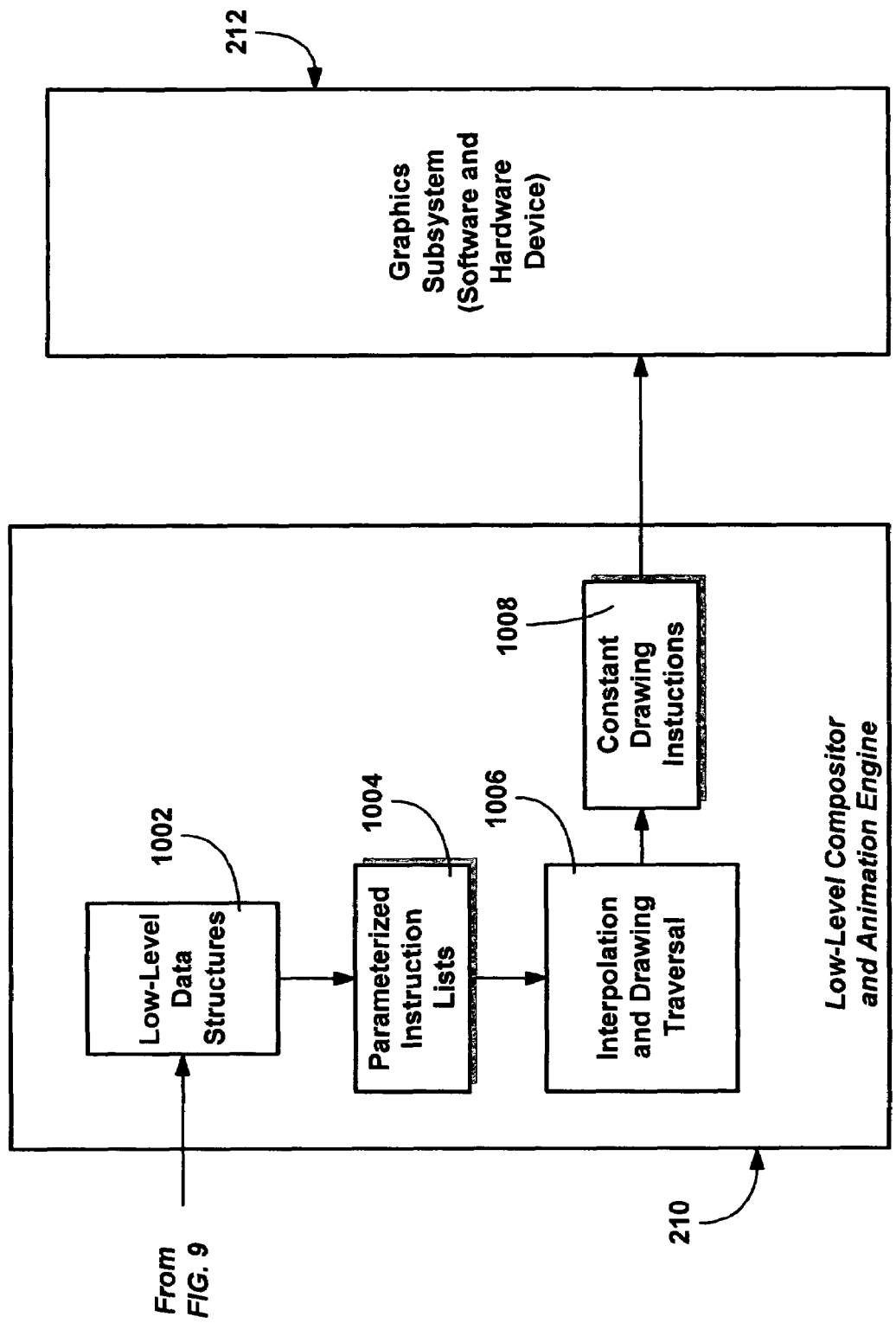

FIG. 8 shows a logical structure of queues 801-804 that implement the client-server communication channel. Timing intervals are embedded in the animated rendering instructions. At render time, the low-level animator and compositing engine 210 passes the current time together with the timing intervals to the renderers. In turn, the renderers use the timing intervals to interpolate the correct parameters for rendering, as described below. The animated rendering instructions are managed by the instruction list manager 714 in response to instruction commands received from the high-level clients. The instruction list manager queues 714 the rendering instructions as they are received. The rendering queues are in Z-order, and the rendering pass manager 722 consumes them at compose time.

In addition to queuing timed rendering instructions, the instruction list manager 714 supports other operations, including emptying the queues 801-804, removing instruction from the queues, adding instruction to the queues, replacing a queue with a new instruction list, and applying a fixed time offset to the queues. A special case for timing controlled rendering is when only the visibility of a rendering instruction is controlled. In such an event, the timing intervals can be used to control the lifetime of an instruction in the rendering queue.

There may be situations when a client needs nested visuals to properly render its contents, such as when video is present in a scene. Because video updating is preformed by an independent rendering process, the low level engine 210 relies on the graphics compositing engine to compose the video and the geometry that overlaps it. This is accomplished by creating new visuals contained in the client application's top level visual, which hides the asynchronous nature of video updating in the graphics compositing engine's compositing pass. The overlapping geometry that shares a visual needs has the same type of alpha behavior (per pixel or transparent).

Animation

In general, animation is accomplished by both the high-level compositor and animation engine 206 and the low-level compositor and animation engine 210. As described above, the media integration layer is divided into multiple graphics processing levels below the user interface or application level. The high-level engine 206 traverses the scene and updates animation parameters with intervals for later interpolation, and packages these simplified data structures into instructions that get passed to the lower-level engine 210. This may be done in a synchronous and/or asynchronous manner. As described below, the interval data can be considered as including the timing endpoints (start and end timing data), as well as the parameterized values for the rendering instruction. Note that the high-level engine 204 can perform some or all of a requested interpolation, e.g., if an interpolation or other motion function is too complex for the lower-level engine 210 to handle, or the lower-level cannot keep up with the processing demands placed thereon, the higher-level engine can perform some or all of the calculations and provide the lower-level with simplified data, instructions, tessellations, and so on to accomplish the desired result. In a typical case when the lower level does perform interpolations, for each frame of animation, the low-level engine 210 interpolates the parameter intervals to obtain instantaneous values, and decodes the instructions into rendering commands executed by the graphics device. The graphics device composes the final scene adding any video frames that might be present in the scene. Other data also may be added, such as content protected by digital rights management.

Communication between the high-level engine 206 and low-level engine 210 is accomplished via an instruction stream, described below. The high-level engine 206 writes rendering instructions to the stream at its slower frequency, or on demand. The low-level engine 210 reads the stream for instructions and renders the scene. Note that the low-level engine 210 may also obtain data needed to render the scene from other sources, such as bitmaps and the like from shared memory.

Thus, the high-level, (e.g., tick-on-demand) engine 210 updates animation parameters and traverses the scene data structures as infrequently as possible while maintaining smooth animation. The high-level engine 206 traverses the scene data-structures, computes an interval describing each animated parameter for a period of time, and passes these intervals and simplified parameterized drawing instructions to the low-level engine 210. The parameter data includes start time, end time, interpolator and interpolation data. By way of example, instead of erasing and redrawing an image so that it appears to move, the high-level compositor and animation engine 206 can instruct the low-level compositor and animation engine 210 as to how the image should change over time, e.g., starting coordinates, ending coordinates, the amount of time (interval) that the image should move between the coordinates, and a motion function, e.g., linear. The low-level compositor and animation engine 210 will interpolate to determine new positions between frames, convert these into drawing instructions that the graphics device can understand, and pass the commands to the graphics device.

Each pass of the high-level engine 206 preferably provides sufficient data for the low-level engine 210 to perform smooth animation over several frames. The length, in time, of the shortest interval may be used to determine the minimum frequency at which the high-level engine 206 needs to run to maintain smooth animation. Scenes that are entirely static or only include simple animations that can be defined by a single interval only require that the high-level engine 206 run when changes are made to the scene by the calling program 202. Scenes containing more complicated animations, where the parameters can be predicted and accurately interpolated for short periods, but still much greater than the hardware refresh rate, require that the high-level engine 206 run at relatively infrequent intervals, such as on the order of once every half seconds. Highly complex animations, where at least one parameter can not be predicted, would require that the high-level engine 206 run more frequently (until at an extreme the system would essentially degenerate to a single-level animation system).

The frequency at which the high-level engine 206 runs need not be uniform or fixed. For example, the high-level engine 206 can be scheduled to run at a uniform interval that is no larger than the minimum interval provided by an animate parameter in the scene. Alternatively, the minimum interval computed on each run of the high-level engine 206 may be used to schedule the next run, to ensure that new data will be provided to the low-level engine 210 in a timely manner. Similarly, when structural changes are made to the scene and/or its animated parameters, the frequency of the high-level engine 206 may be run to ensure that the new scene is accurately animated.

The low-level (e.g., fast-Tick) engine 210 is a separate task from the high-level engine 206. The low-level engine 210 receives the simplified parameterized drawing instructions and parameter intervals describing the scene from the high-level engine 206. The low-level engine maintains and traverses these data structures until new ones are provided by the high-level engine 206. The low-level engine may service multiple high-level engines 206, maintaining separate data structures for each. The one-to-many relationship between the low-level engine 210 and high-level engine 206 allows the system to smoothly animate multiple scenes simultaneously.

The low-level engine 210 interpolates essentially instantaneous animation parameters based on the high-level engine's provided intervals, updates drawing instructions and renders the scene for every frame. The low-level engine 210 task runs at a high priority on the system, to ensure that frames are ready for presentation such as at the graphics hardware screen refresh rate. The interpolations performed by the low-level engine 210 are thus typically limited to simple, fast functions such as linear, piecewise linear, cubic spline and those of similar speed. The low-level engine 210 runs at a regular frequency, or frame rate, that is ordinarily an integral divisor of the hardware refresh rate. Each frame rendered by the low-level engine 210 will be displayed for a consistent number or refreshes by the graphics hardware.

Figure 25:
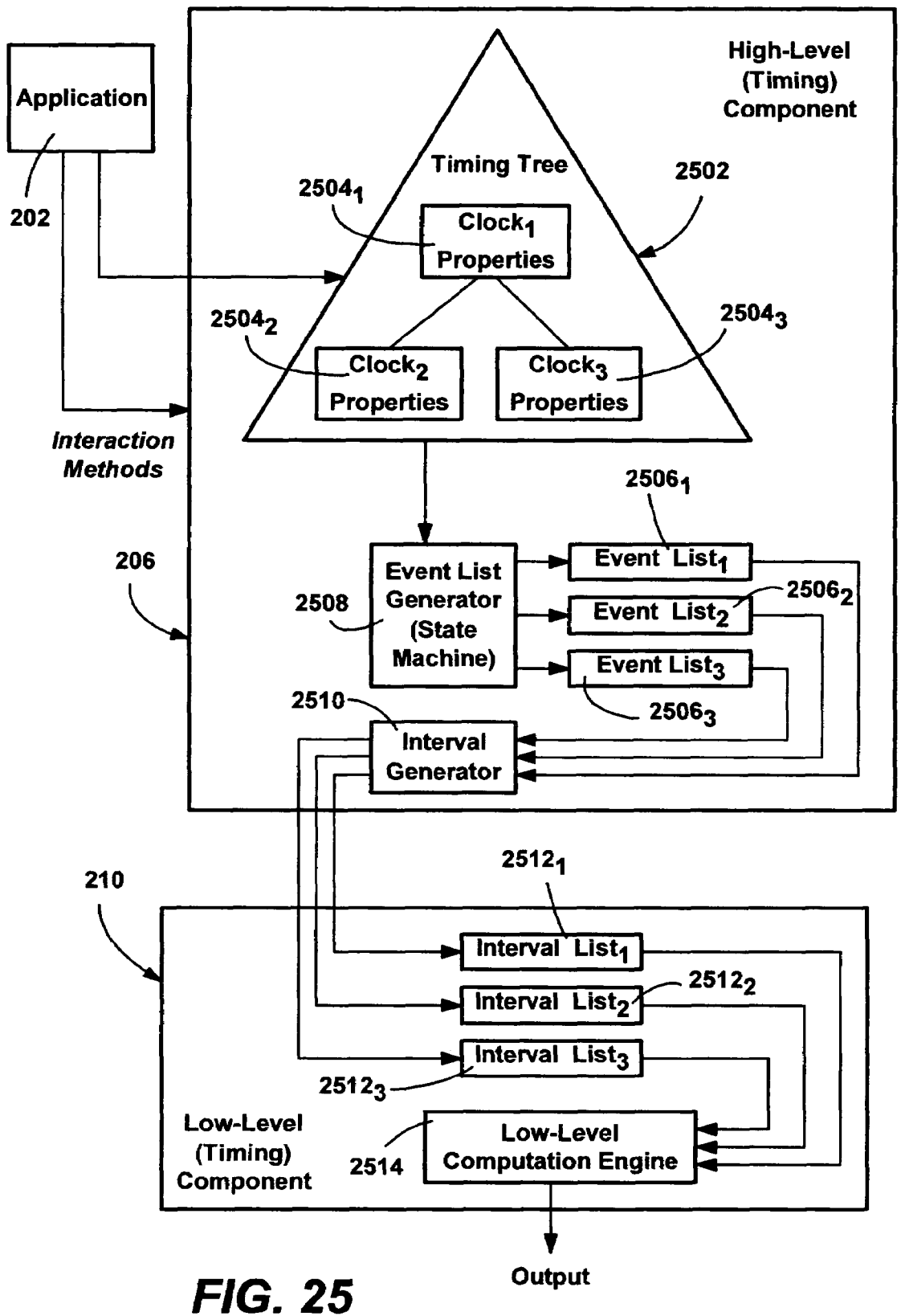
FIGS. 25 and 26 are block diagrams generally representative of a two-level architecture having timing components for converting clock property data to intervals for use in determining progress data, in accordance with an aspect of the present invention.
Figure 26:
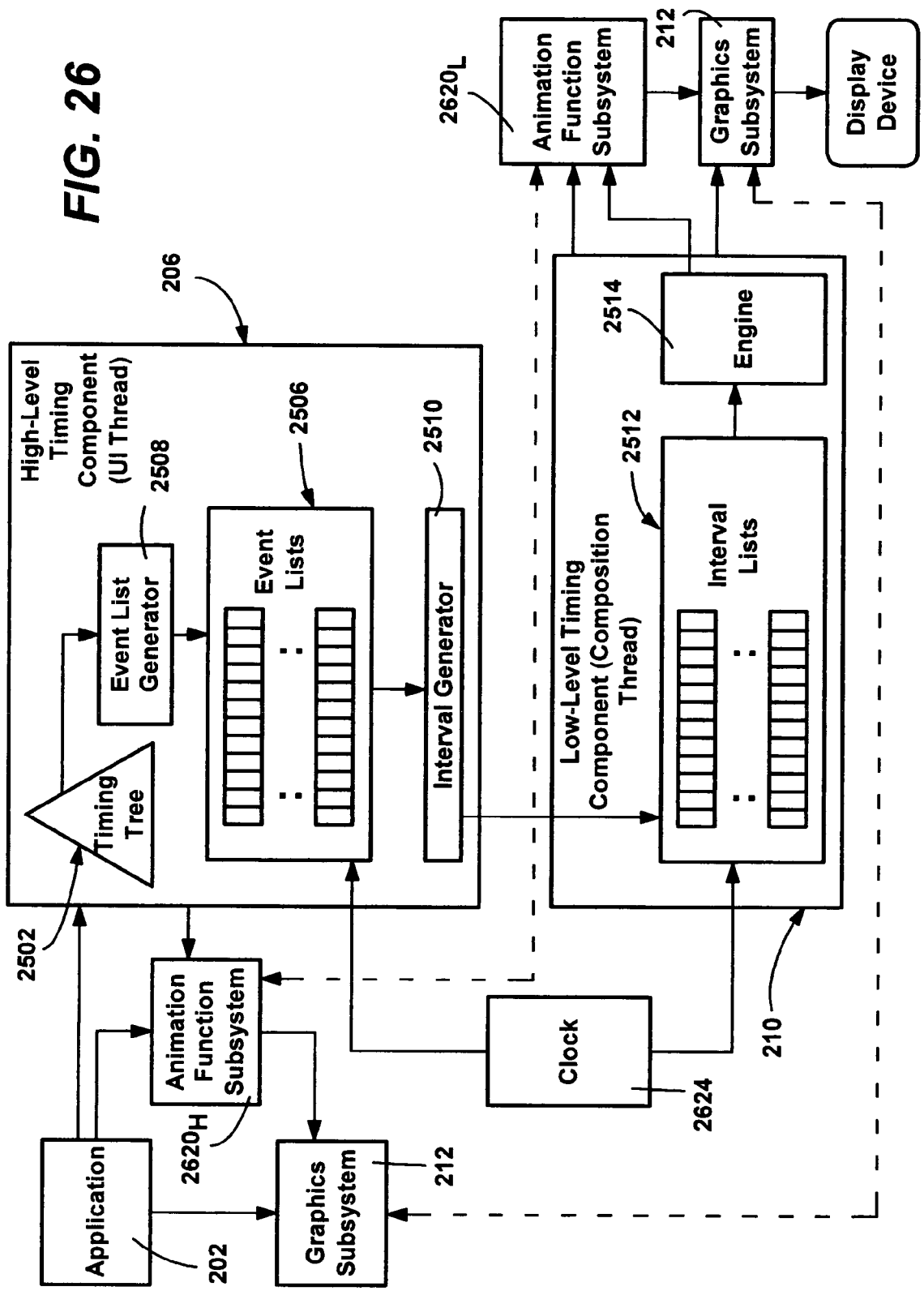

In accordance with an aspect of the present invention and as generally represented in FIGS. 25 and 26, a program such as the application program 202 specifies animation property values along with timing information, referred to as clocks or clock properties, to the high-level component 206. As described below, essentially any independent animation or media (e.g., linear media such as video and audio) will have a clock maintained for it at the high-level component. The clock properties are timing properties that define the initial synchronization relationship between a given clock and the rest of the timing structure. As shown in FIG. 26, the high-level component 206 may call high-level animation functions $2620_H$ (e.g., written in managed code) in order to determine a current value of a property of an animation. During fast frame rate computations, the low-level component 210 calls similar (or the same) animation functions $2620_L$ with the progress computed by the engine 2514 in order to determine a current property value of an animation. Note that in alternative imple-mentations, the animation functions may be built into the lower level component, for example.

In general, animations and linear media are associated with a set of clocks which are related to each other by synchronization primitives and rules. The clocks may be hierarchically arranged, e.g., the application program has a parent clock, and animated objects of the application program are children, which in turn may have other children. When a property of a clock is defined or modified, any children of that clock are affected. For example, pausing a parent clock pauses any of its child clocks, and doubling the speed of a parent clock doubles the speed of any of its child clocks.

These clock properties may be modified by source events comprising interactive control events initiated by the application at run-time. Thus, the clocks are interactive, in that each clock can be individually started, paused, resumed and stopped at arbitrary times by the application, e.g., in response to user input. In addition, new clocks can be added to the timing structure, and existing clocks can be removed.

Thus, one factor influencing the run-time of the timing update operation is the interaction of the synchronization rules. Because the time required to update the clocks is proportional to the number of clocks involved, the present invention converts a clock representation based on relational synchronization primitives to one based on independent intervals. As a result, to achieve predictable run-time behavior, the low-level timing engine is able to treat its clocks as independent entities. To this end, as described below, the high-level timing component generates an interval list for each clock based on a stored list of events (begin, pause, and so forth) and the associated synchronization primitives. The activation intervals are straightforward, non-overlapping segments that describe the time expressed by a given clock at different points in real-world time.

For purposes of explanation, the following description will generally reference an animation, such as a moving geometric shape, however it will be understood that linear media likewise has a beginning and a duration, and can be interactively paused and resumed like an animation. Also, it should be noted that movement is not necessary for animation, as animation is capable of varying any characteristic over time, which includes position and rotation, but also includes concepts such as color, opacity, size, and so forth. Thus, the present invention should be considered as capable of handling anything that can be varied over time, including animations and linear media.

As represented in FIG. 25, at least some of the clock properties may be hierarchically related in a timing tree 2502 of clocks. Three such clocks with their properties are shown in FIG. 25, namely clock properties $2504_1$-$2504_3$, however it is understood that many more clocks and alternative timing trees may be present in a given situation. By way of example, consider a clock with the following properties, as provided by an application program:

| Property | Value |
|---|---|
| Begin time | 0 |
| Duration | 10 seconds |
| Repeat count | 2 iterations |

Note that these properties need not all be present, and/or alternative properties may be specified. For example, the begin time for a clock may default to zero (corresponding to the system clock's value at that moment), the repeat count may have a default value of one, and so on. Further, an end time property value is essentially equivalent to specifying a duration property value.

In accordance with an aspect of the present invention, for each clock, which for example may correspond to an animated object to be displayed, the high-level component 206 includes a state machine that generates an event list (e.g., 2506₁) from the clock properties. The state machine is referred to herein as an event list generator 2508. In general, the event list generator 2508 groups the events that were initially scheduled by the specified clock properties together with any explicit interactive events, such as pause and resume requests that are received with respect to the animation, into an event list. A clock is maintained for each animation, and thus there is an event list corresponding to each animation (as well as one for each linear media). A further description of the event list generator 2508 along with an example of an event list is described below.

In accordance with an aspect of the present invention, the high-level component includes an interval generator 2510 that uses the event list (e.g., 2506₃) for each animation or media to compute a corresponding interval list (e.g., 2512₃), which is passed to the low-level component 210. In turn, the low-level component 210 includes a low-level computation engine 2514 that controls the output based on the current time with respect to the interval data, such as by providing a progress value based on the interval data for that object and the current time to an low-level animation function subsystem 2620_L that determines a current value for the varying property of an animated object. For example, for any given frame, the low-level computation engine 2514 interpolates the location of the animated object based on the interval data and the current time. Note that as shown in FIGS. 25 and 26, the high-level timing component includes the timing tree 2502 and the event lists 2506₁-2506₃, while the low-level timing component 210 includes the interval lists 2512₁-2512₃, however these data structures may be maintained essentially anywhere in storage, ordinarily in high-speed random access memory.

To summarize, the high-level timing component 206 sees a tree 2502 of clocks related (e.g., hierarchically) by synchronization rules and primitives. The present invention uses the clocks in the high-level timing component 206 to compile lists of activation intervals 2512 that are consumed by the low-level timing engine. The low-level timing engine sees the interval lists 2512, which represent independent (e.g., per-animated object or per-linear media) clocks. As shown in FIG. 26, there is a clock that provides a consistent time to both, such as the system clock 2624, so that the multiple levels remain in synchronization.

In response to interactive changes received from the application 202 (or some other source), the high-level timing component needs to update the state of the clock that is directly involved with that change, as well any that are indirectly involved as specified by the synchronization primitives. Note that it is possible that a change to a single clock can affect every clock in the timing structure. For example, a presenter of a slide show can pause the entire display, whereby any animations and linear media currently being displayed need to be paused. The time required to perform such an update is generally proportional to the number of clocks and thus may be arbitrarily large. As such, the high-level component performs the update, rather than the low-level component that is attempting to operate at a consistent frame rate by drawing each single frame within a predictable, bounded execution time.

As described above, the event list generator 2508 in the high-level component 206 that converts timing properties and timing events into an event list from which a list of activation intervals is determined. In the above example, the following clock properties were provided by an application program:

| Property | Value |
|---|---|
| Begin time | 0 |
| Duration | 10 seconds |
| Repeat count | 2 iterations |

When received, these properties correspond to the following set of events, (with scheduled and implicit events described below):

| Time | Event |
|---|---|
| 0 seconds | Begin (scheduled) |
| 10 seconds | End (implicit) |
| 10 seconds | Begin (implicit) |
| 20 seconds | End (scheduled) |

In the absence of any interactive timing events, the following comprises a list of intervals for this clock, (also shown via a graphical representation in FIG. 27):

| Begin time | Initial progress | End time | Final progress | Iteration |
|---|---|---|---|---|
| 0 | 0% | 10 | 100% | 1 |
| 10 | 0% | 20 | 100% | 2 |

Figure 27:
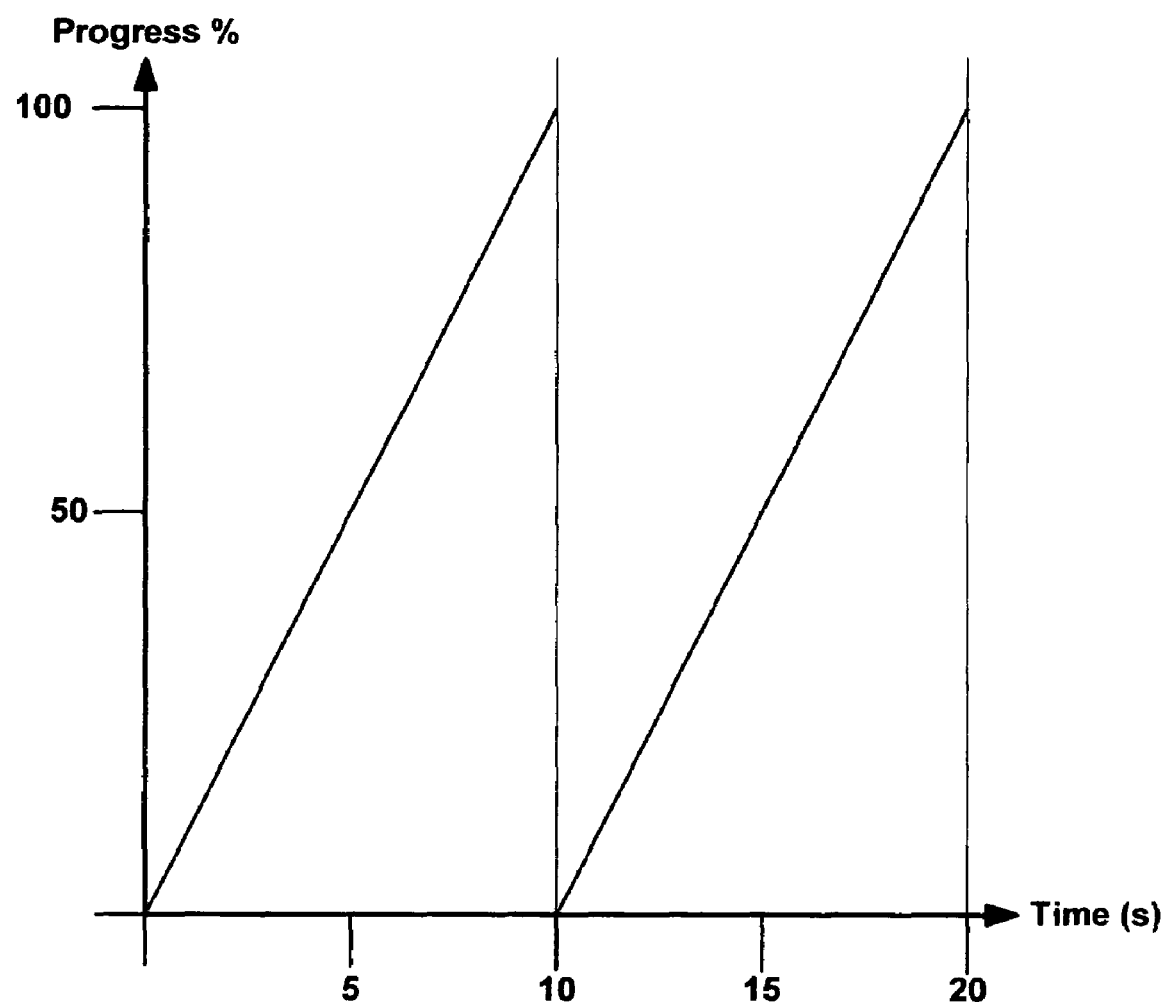
FIG. 27 is a timing diagram graphically representing progress of an animation or linear media over time intervals based on clock data, in accordance with an aspect of the present invention.
Figure 28A:
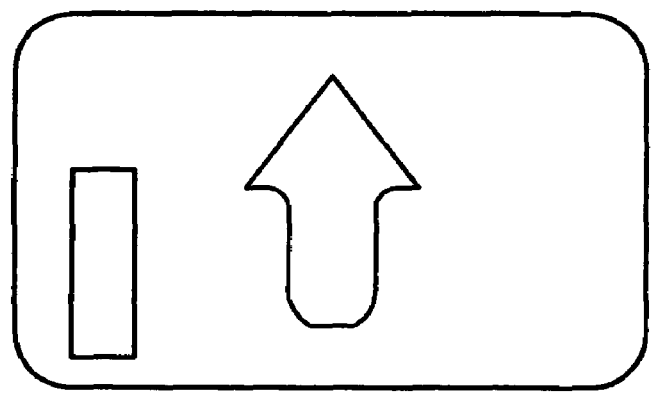
FIGS. 28A-28C are representations of an animated object over time within a time interval based on clock data, in accordance with an aspect of the present invention.
Figure 28B:
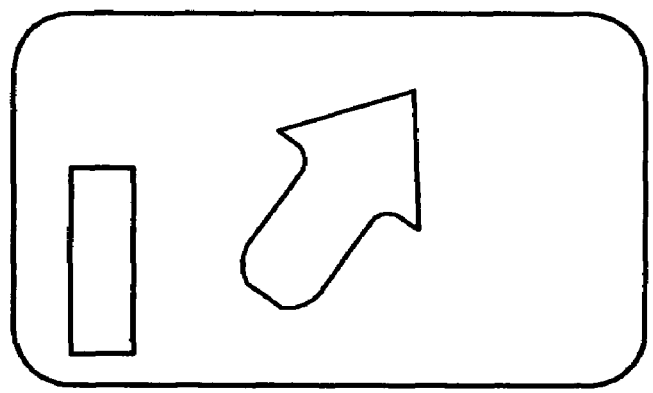
Figure 28C:
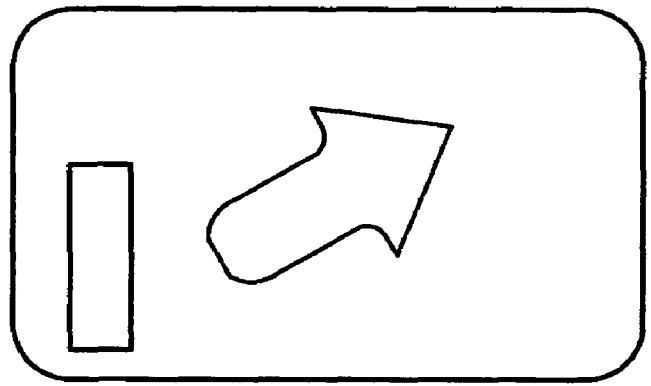

As can be seen in the table above and in FIG. 27, the object's animated property value (or value) varies from its starting value (zero percent) to its ending value (one-hundred percent) over ten seconds, and then repeats once in a second iteration. Thus for example, if an object (e.g., the displayed arrow in FIG. 28A) has an animated angle property that starts at zero degrees rotation, and ends at sixty degrees as in FIG. 28C, given the above clock properties (and linear progression), at exactly six seconds the lower level component will compute the object's rotation to be thirty-six degrees (FIG. 28B) when building the corresponding frame. At ten seconds, the object returns from sixty degrees rotation to zero degrees (FIG. 28A) to start the second iteration, and continues rotating at six degrees per second. Note that once the current interval is determined via the current time, such an interpolation to determine the property value is a very straightforward, rapid calculation based on a simple formula using the values in the above table and the current time relative to the beginning time. Thus, it can be seen that once set up, an animation will progress smoothly from beginning to end, even without further communication between the higher and lower level components.

However, interactive events are possible, as shown in the following list of events:

| Time | Event |
|---|---|
| 5 seconds | Pause |
| 17 seconds | Resume |
| 25 seconds | Stop |

Figure 29:
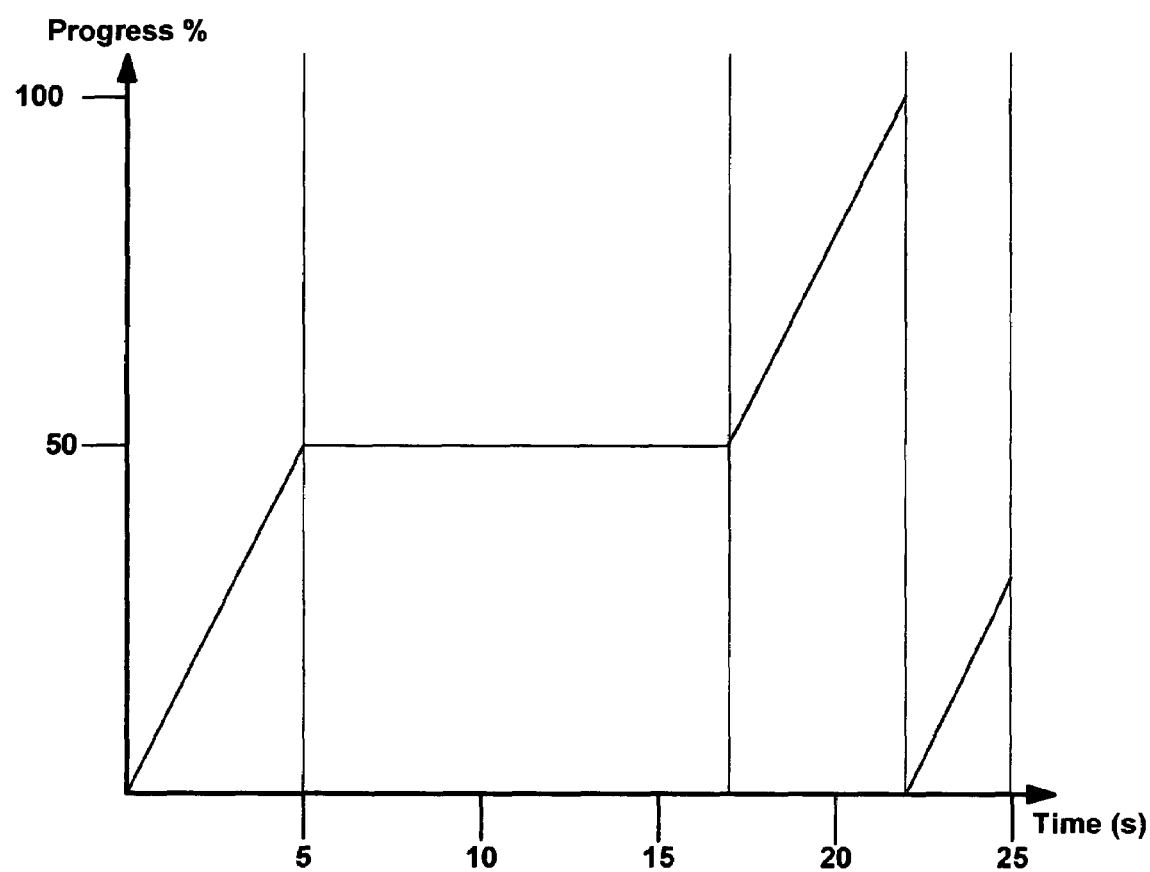
FIG. 29 is a timing diagram graphically representing progress of an animation or linear media over time intervals based on clock data, in accordance with an aspect of the present invention.
Figure 30:
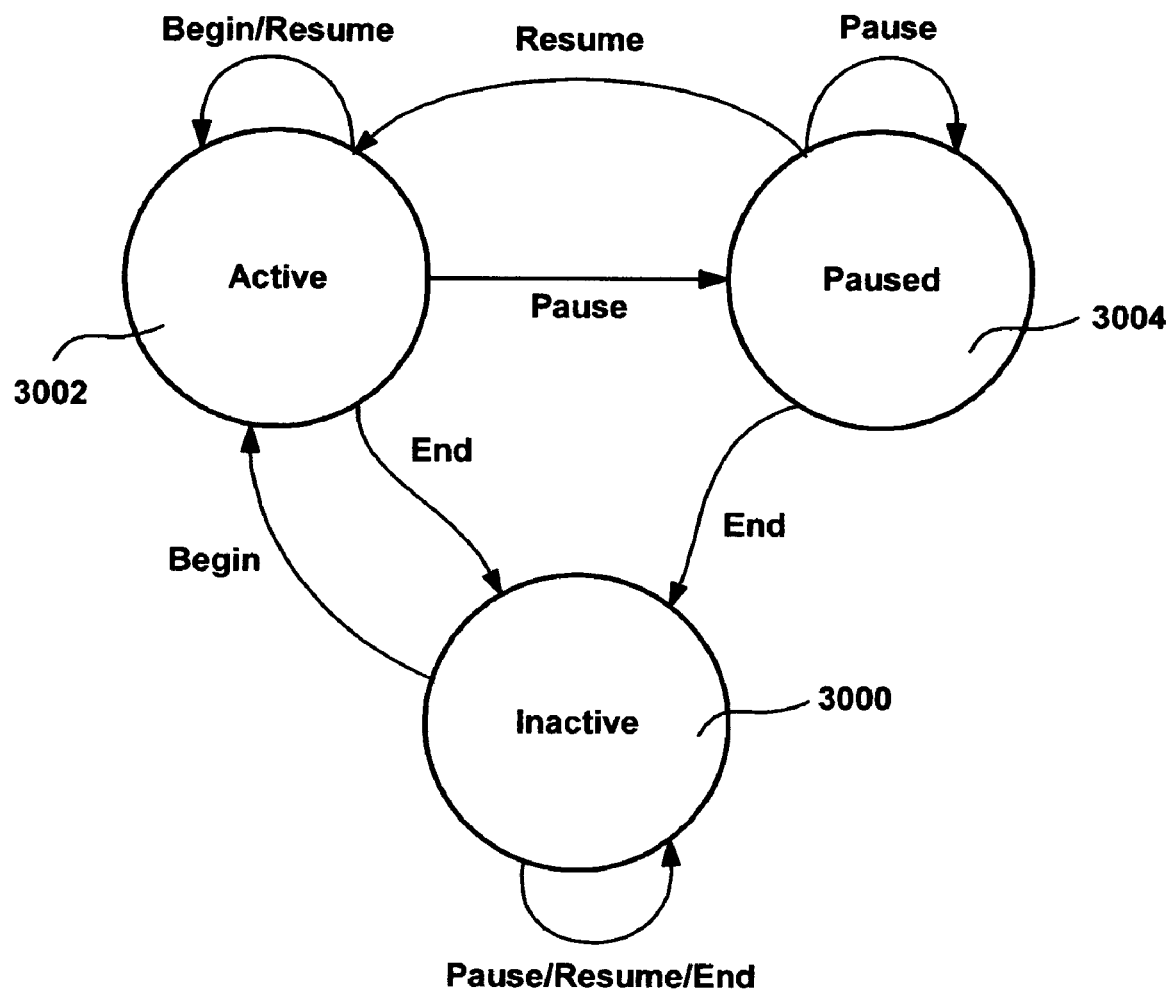
FIG. 30 is a state diagram graphically representing states of an animation as controlled by events, in accordance with an aspect of the present invention.

If the clock experiences these events at the specified times, then the interval list is different as set forth in the interval data below and as also graphically represented in FIG. 29:

| Begin time | Initial progress | End time | Final progress | Iteration |
|---|---|---|---|---|
| 0 | 0% | 5 | 50% | 1 |
| 5 | 50% | 17 | 50% | 1 |
| 17 | 50% | 22 | 100% | 1 |
| 22 | 0% | 25 | 30% | 2 |

In the second interval, corresponding to the time between five seconds and seventeen seconds, the progress value of the clock is constant throughout, corresponding to a paused state. Further note that the application halts the second iteration at time twenty-five seconds, and thus the progress of the second iteration stops at thirty percent, otherwise it would have continued to one-hundred percent at a time of thirty-two seconds.

It should be noted that because interaction is normally under the user's control, when a pause event is received, the pause is not necessarily for a defined length of time, that is, there is not necessarily a resume event received with the pause event. However, the timing mechanism of the present invention will operate properly regardless of when timing date is received, e.g., it is capable of handling one or more interactive events specified for the present as well as for the future, such as resume at five seconds (e.g., now), pause at eight seconds, resume at fourteen seconds, stop at nineteen seconds. Similarly, a resume event is not necessarily accompanied by the stop event. Thus, although not individually shown, it should be understood that there may be intermediate event lists and interval lists that are provided in between those described above, whenever one or more interactive events are received. For example, the above pause request may be received at five seconds with fifty percent progress, without any resume or end specified, and thus the interval list will instruct the low-level component to end at some infinite (or very large) time, while remaining at fifty percent progress. When the resume request is received, such as at time seventeen seconds (or specifying seventeen seconds if in the future), the tables would be rebuilt such that the event list and interval list generated therefrom would include the following at this time:

| Time | Event |
|---|---|
| 5 seconds | Pause |
| 17 seconds | Resume |

| Begin time | Initial progress | End time | Final progress | Iteration |
|---|---|---|---|---|
| 0 | 0% | 5 | 50% | 1 |
| 5 | 50% | 17 | 50% | 1 |
| 17 | 50% | 22 | 100% | 1 |
| 22 | 0% | 32 | 100% | 2 |

Note that receipt of the stop request will again result in the tables being modified. In this case, the tables will be rebuilt to match those shown above (that is, those with the stop event at twenty-five seconds in the event list, corresponding to an end time of twenty-five seconds at thirty percent progress in the interval list).

In accordance with an aspect of the present invention, to generate the interval list from the clock properties and interactive events, the event list generator 2508 first groups together any explicit interactive events with the events that were initially scheduled by the specified clock properties into an event list:

| Time | Event | Type |
|---|---|---|
| 0 | Begin | Scheduled |
| 5 | Pause | Interactive |
| 17 | Resume | Interactive |
| 25 | End | Interactive |

The machine then inserts additional implicit events based on other properties, such as the duration:

| Time | Event | Type |
|---|---|---|
| 0 | Begin | Scheduled |
| 5 | Pause | Interactive |
| 17 | Resume | Interactive |
| 22 | End | Implicit |
| 22 | Begin | Implicit |
| 25 | End | Interactive |

Note that the end and begin at time twenty-two seconds are implicit events added to complete the first iteration and restart the second iteration, based on the duration in this example.

In accordance with an aspect of the present invention, these events are paired off to form intervals. There is an interval for every pair of consecutive events, excluding those events which occur at the same time which are not considered to be an interval (as such an "interval" would have zero length). Thus, in the above table and in FIG. 29, it is seen that there is a first interval from zero to five seconds, a second interval from five to seventeen seconds, a third interval from seventeen to twenty-two seconds, and a fourth interval from twenty-two to twenty-five seconds.

In general, the event list generator 2508 walks the combined list of scheduled and interactive events and inserts the implicit events, based on the state machine of the event list generator 2508. This enables the intervals to be properly defined. The state machine is generally represented via the states shown in FIG. 30, in which the initial state of the machine is "inactive," as it refers to the state of the clock before a begin event is seen. As the event list generator 2508 (FIG. 25) walks the list of events, the event list generator 2508 transitions from state to state based on the events, e.g., a begin event when in the inactive state 3000 transitions to the active state 3002, a pause when in the active state 3002 transitions to the paused state 3004, a resume when in the paused state 3004 transitions to the active state 3002. Note that when a state "transitions" to itself, whether scheduled, implicit or interactive, that event is marked as unused. Given the current state and the next event, the algorithm decides whether an implicit event needs to be inserted. For example, if the current state is "active" or "paused" and the next event is "begin," then an implicit "end" is inserted immediately before that next "begin." As a last step, the event list generator 2508 enforces ending in the inactive state by inserting an implicit "end" event, if necessary.

After the event list generator 2508 has finished adding implicit events, it is straightforward to produce the interval list from the event list. In general, each unique time pairing that corresponds to events that are used (not marked as unused) defines an interval.

Because the timing engine is interactive, new interactive events may be added to the event list at any time. When this occurs, the event list generator 2508 is executed to clean up the event list, which may result in a change to the interval list. By way of example, consider an interactive "resume" event inserted at time nine seconds into the list above. Immediately after insertion the event list comprises:

| Time | Event | Type |
|------|-------|------|
| 0 | Begin | Scheduled |
| 5 | Pause | Interactive |
| 9 | Resume | Interactive |
| 17 | Resume | Interactive |
| 22 | End | Implicit |
| 22 | Begin | Implicit |
| 25 | End | Interactive |

At this point the implicit "end/begin" pair at time twenty-two seconds is no longer valid, because the "resume" at time nine seconds supersedes the one at time seventeen seconds. This data needs to be removed, and new implicit events inserted instead. After walking the event list and running the event list generator 2508, the modified event list is set forth below:

| Time | Event | Type |
|------|-------|------|
| 0 | Begin | Scheduled |
| 5 | Pause | Interactive |
| 9 | Resume | Interactive |
| 14 | End | Implicit |
| 14 | Begin | Implicit |
| 17 | Resume | Interactive (unused) |
| 24 | End | Implicit |
| 25 | End | Interactive (unused) |

Note that two interactive events are marked "unused" in this new list. The first "resume" is unused because the clock is not in a paused state at the time this event is encountered, therefore it will have no effect. Similarly, the last interactive "end" is unused because the clock is no longer active by the time that event would be reached. These unused events are marked as such but not deleted from the list, however, because a further interactive event (e.g., inserting a "pause" at time fifteen seconds) may make these events relevant again.

Events that are marked unused in the list are ignored when generating the intervals to provide to the lower-level component. In the above example, the following table comprises the resulting interval list:

| Begin time | Initial progress | End time | Final progress | Iteration |
|------------|------------------|----------|----------------|-----------|
| 0 | 0% | 5 | 50% | 1 |
| 5 | 50% | 9 | 50% | 1 |
| 9 | 50% | 14 | 100% | 1 |
| 14 | 0% | 24 | 100% | 2 |

In general, anytime that interaction occurs with respect to an object, the event list is regenerated and the interval list recomputed and sent to the lower-level timing component. The higher-level component performs these operations, (for example at a frequency on the order of six to ten times per second) such that the lower level component (e.g., operating at sixty times per second) only needs to deal with the current interval list for each animated object.

Note that because of the relationships of the clocks as maintained at the high-level component, the interaction may result in many tables being changed. For example, a presentation program may be paused, causing each animated object in a displayed program window (e.g., a slide of a slide show) to be paused. The presenter may go back to a previous slide, whereby each of the clocks corresponding to animated objects of that previous slide are restarted so as to being from time zero. In other words, the event lists are cleaned out for a parent clock, (such as the clock corresponding to an application) and any children (such as corresponding to animated objects of that application) so as to only include scheduled events, and new interval lists generated from the cleaned out event lists and provided to the lower-level component. This makes sense generally, as, for example, a presenter going back to a previous slide, would want to begin interacting with that slide anew, without possibly long-ago specified pauses and resumes suddenly occurring. In general, a restart is an end followed by a begin.

In an implementation described herein, although there are possibly many related clocks, the lower-level component does not concern itself with such relationships, but only deals with independent intervals. The lower-level component instead receives an independent interval list per animation or linear media, and for example, uses the interval data along with the current time to determine the current interval and thereby interpolate the appropriate property values for an animated object when constructing a frame. Note that in alternative implementations, it is feasible for the lower-level component to maintain some relationship data, and/or to have the higher-level component specify that a single interval list applies to multiple animations and/or linear media.

In addition to this interval information and the starting and ending values for an object, additional parameters may be sent to the higher-level component and result in changes to the interval list. For example, an application can seek to a period in time, which corresponds to an event. The application specifies when the seek is to occur, and by how much. Like rewinding or fast-forwarding media, with a seek on an animation, an application can thus jump ahead or back to a particular point in time. A reverse event is another type of scheduled or interactive event that an application may specify. In general, when a reverse event is in the list, the progress will automatically reverse, e.g., from one-hundred percent to zero percent.

Speed changes are also supported, e.g., everything below a certain clock can be set to run faster or slower than actual time. Other attributes may be specified, such as to indicate for a particular clock whether restart is allowed, and/or whether to begin again if not currently running, e.g., start at one second, begin again at ten seconds, begin again at one-hundred seconds, and so forth, but optionally do or do not restart if currently running.

Figure 31:
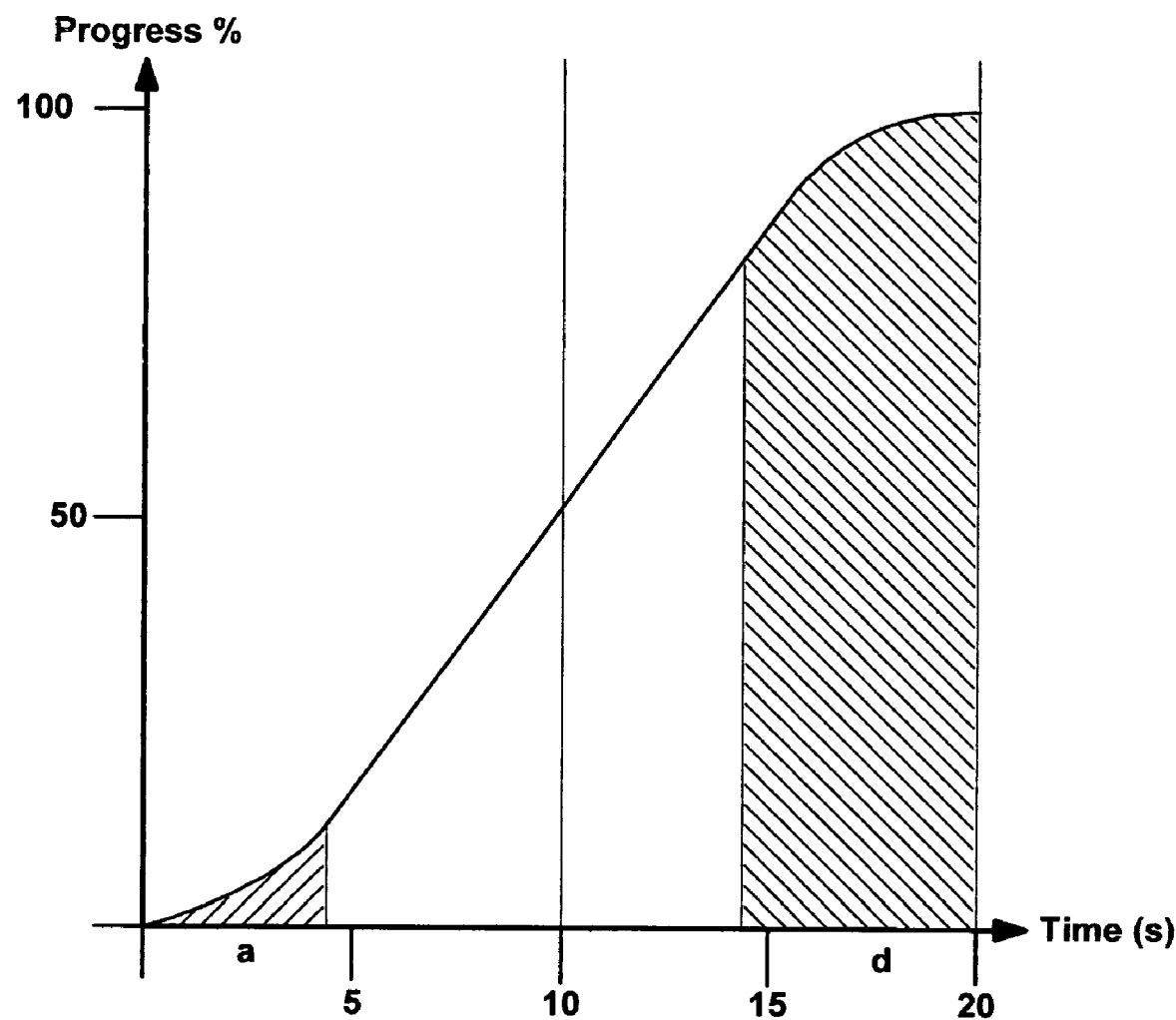
FIG. 31 is a timing diagram graphically representing progress of an animation or linear media over time intervals based on clock data and acceleration and deceleration information, in accordance with an aspect of the present invention.

A list of such attributes is set forth below:

Acceleration
AutoReverse
Begin
Deceleration
Duration
End
EndSync
Fill
FillDefault
RepeatCount
RepeatDuration
Restart
RestartDefault
Speed As another example, acceleration and/or deceleration may be specified as parameters, such as specified as a percentage of the duration, whereby a suitable exponential function or the like would be used in the interpolation. FIG. 31 is a graphical representation of this concept, where acceleration is specified to end at twenty percent (four seconds) of the specified duration (twenty seconds), and deceleration is specified to begin when seventy percent (fourteen seconds) of the full duration is achieved, that is, when thirty percent of the duration remains. Linear progress occurs between four and fourteen seconds. Acceleration and deceleration when used with motion of an animation are often considered to be more visually appealing than a consistent linear change.

In addition to acceleration and deceleration, non-linear interpolation in general also may be specified, such as by specifying data indicative of a function. In essence, essentially any function that the higher-level and lower-level agree upon can be used in the interpolation for any given, although for practical purposes the function cannot be so complex that the lower-level thread cannot complete these computations and the computations for possibly many other objects within the relatively short time it has, e.g., corresponding to the frame refresh rate.

High-Level, Low-Level Communication

Turning to an explanation of the interaction between the high-level compositor and animation engine 206 and the low-level compositor and animation engine 210, a number of configurations are feasible, including in-process, in which the low-level engine 210 serves only one high-level engine 206 and both exist in the same process. A cross-process configuration is also available, in which the low-level engine 210 still serves only one high-level engine 206, but the high-level engine 206 and low-level engine 210 are in independent processes.

A desktop configuration is an extension of the cross-process configuration, where the low-level engine 210 services many instances of high-level engines, and controls rendering of the entire desktop. A remote configuration is also available when the high-level engine 206 is on a server machine and the low-level engine 210 is on a client machine. The remote case can either have a one-to-one relationship between the high-level engine 206 and the low-level engine 210, or the low-level engine 210 may serve many local and remote high-level engines. The remote configuration can be thought of very similar to the cross-process and desktop configurations, but with the high-level engine 206 and low-level engine 210 on different machines.

In keeping with the present invention, the data in the high-level engine 206 is prepared for transmission to the low-level engine 210, and the low-level engine 210 processes the data upon receipt. Details on the data format, along with how the data is created in the high-level engine 206 and used for rendering by the low-level engine 210 are generally described below.

Figure 11:
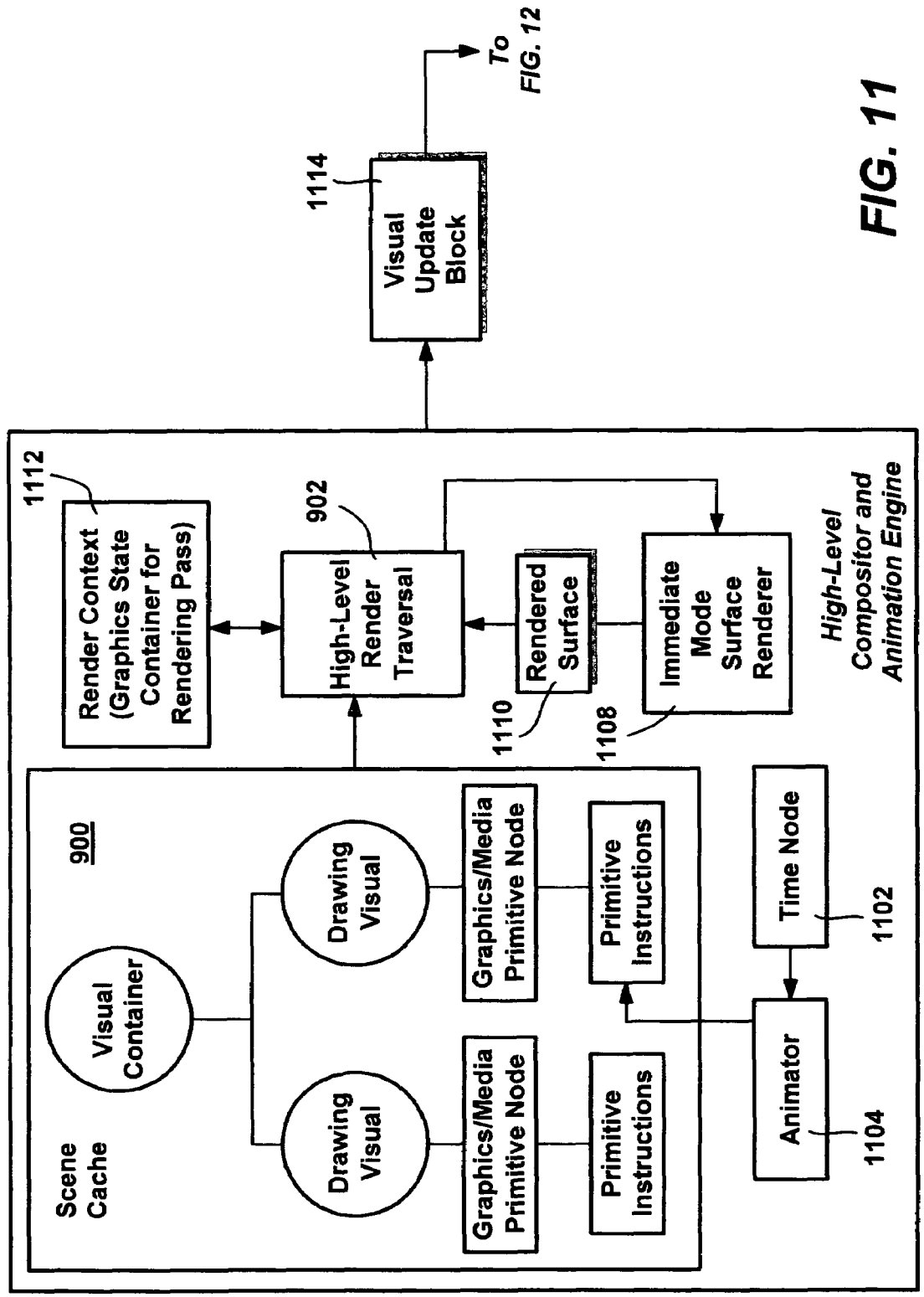
FIGS. 11 and 12 are block diagrams representing the flow of information through the media integration layer architecture layer to a graphics subsystem in accordance with an aspect of the present invention.
Figure 12:
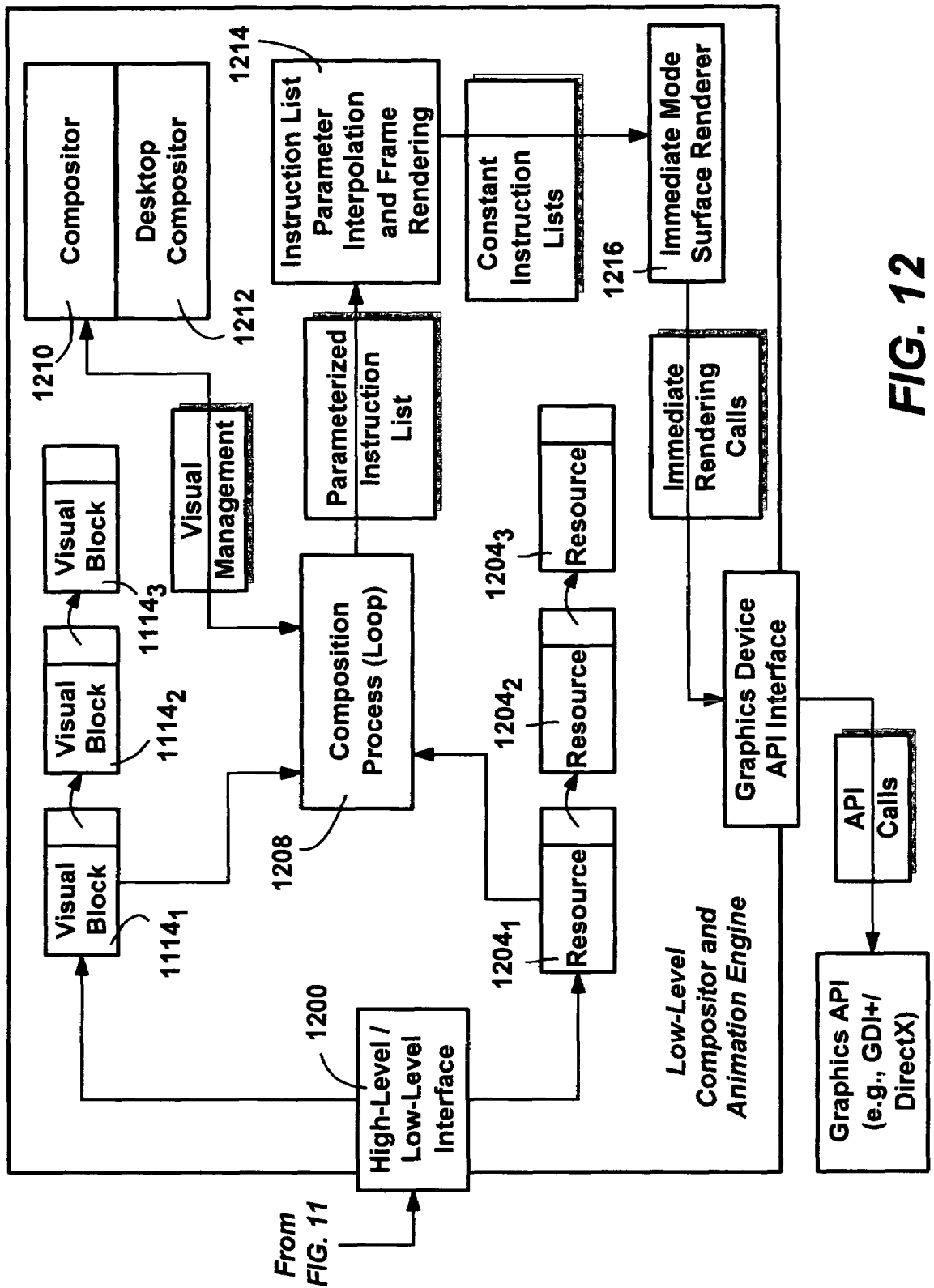
Figure 14:
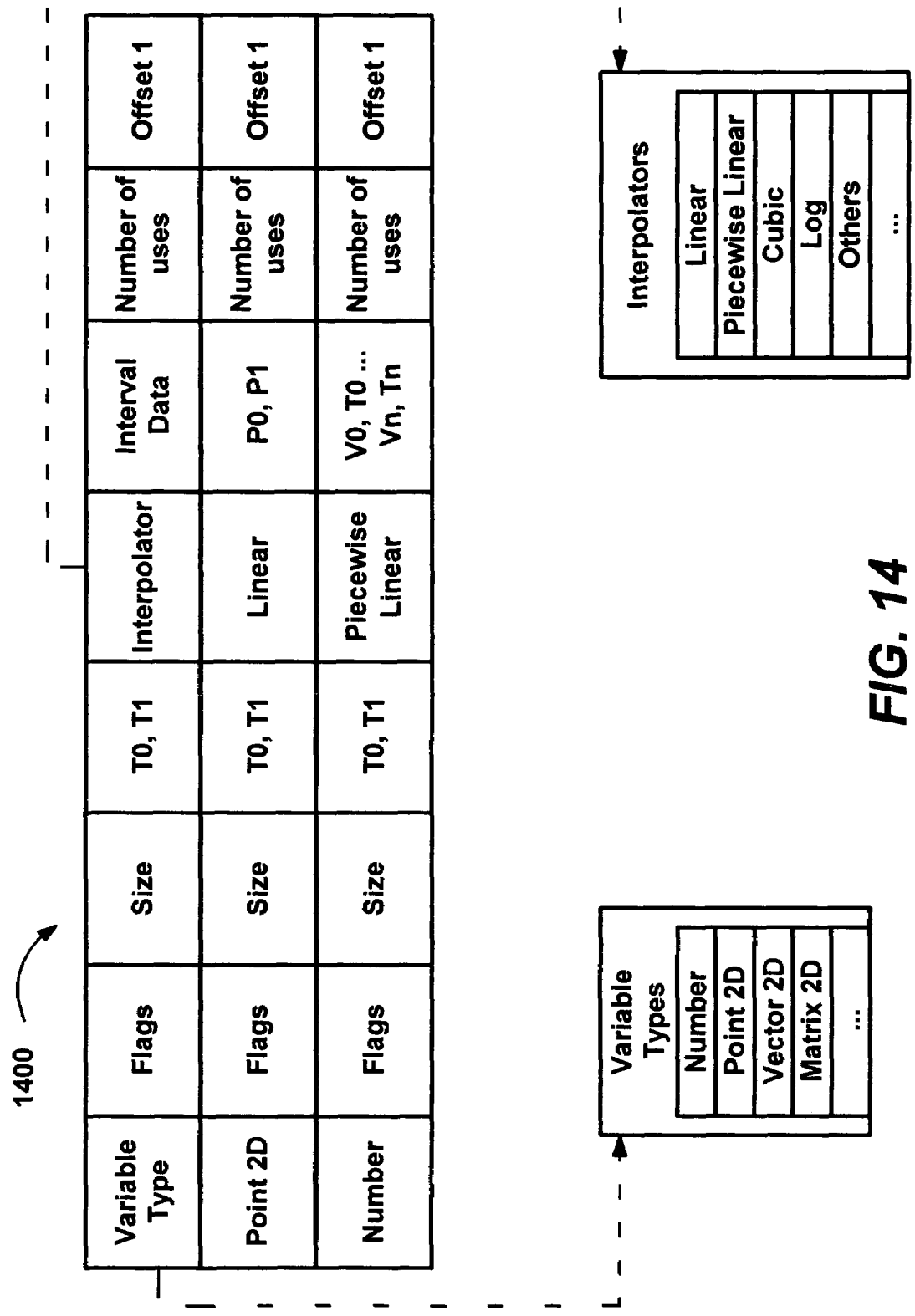
Figure 15:
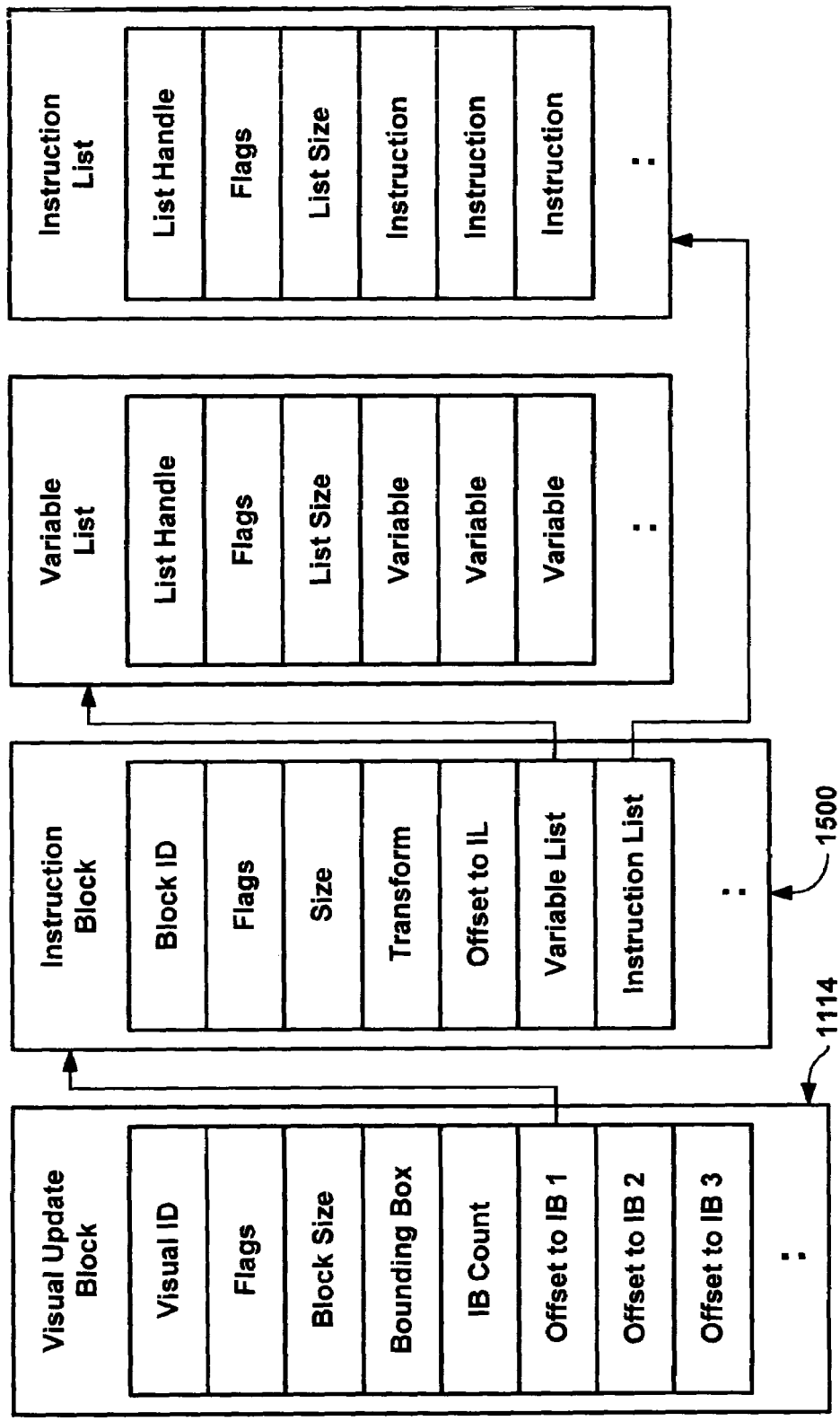

The conceptual interaction and data flow between the high-level engine 206, low-level engine 210 and graphics device is shown in FIGS. 9-12, while FIGS. 13, 14, and 15 provide various example data structures used in the communication. In general, a high-level engine rendering traversal (e.g., loop) 902 traverses the scene cache tree 900 and creates data structures 904 (including visual update blocks 1114. FIG. 11) via multiple iterations of sub-steps. This includes creating resources to be used in the scene cache, and creating declarative animations for use in the display tree. Animator objects are created for values that are to vary, whereby an animator is used in the media integration layer drawing API instead of a constant. The high-level engine 206 display data structures 904 are then created, referencing the resources and animators previously created. The display data may also reference other sub-trees. To be activated, animators (e.g., 1104, FIG. 11) are connected to a timing tree/node structure (e.g., 1102, FIG. 11). Typically, an application would create a time node 1102 to control starting, stopping, and the progress of each animator 1104.

Once the model, including timing and animation, has been created, the high-level engine's traversal loop 902 will traverse the display tree 900 to begin drawing. As described above, the frequency of high-level engine 206 traversals depends on the amount and complexity of timing and animation. For example, static scenes need only be traversed when the application makes changes.

The high-level traversal process 902 occurs in multiple passes. In a pre-compute pass, the first traversal of the tree 900 performs calculations needed for drawing. For example, bounding boxes are calculated for each subtree, and animate values are updated. As described above, rather than a single instantaneous value, an animator 1104 may provide an interval. The interval includes the start and end times, which type of interpolator to use, and the data for the interpolation. The resources used by the display tree are then sent to the low-level engine 210 for realization.

A second traversal packages the information describing the scene to be sent to the low-level engine 210 for rendering. To this end, each subtree in the graph is represented by one or more instruction blocks, as represented in the data structures and information shown in FIGS. 13-15. The high-level engine 206 accumulates instruction blocks (e.g., 1500 of FIG. 15) into a single visual update block 1114 for each top level visual (i.e., window). Instruction block subtrees that have not changed since the last traversal are not appended. Instruction blocks for subtrees with only declarative animation changes will only include the variable block of interpolation information. Instruction blocks for subtrees that have been repositioned with a transformation only include the header.

The low-level engine 210 rendering thread (or process) runs in a loop 1208 (FIG. 12), rendering and composing visuals at high-frame rate, ideally the refresh rate of the display. The loop 1208 performs a number of steps, including applying any visual update blocks (e.g., $1114_1$-$1114_3$)

received from the high-level engine 206. Interpolated values for resources and windows being drawn on this pass are updated. For each variable in the instruction block's variable list, the instantaneous value for the next frame is computed. Then, the loop 1208 iterates over the offsets to locations in the instruction list where it is used, memory copying the new value.

Updated off-screen resources are rendered, although alternatively resources could be rendered on their first use. Instruction lists for each top level visual are rendered, and the data "blt-ed" to the display, flipped, or otherwise arranged to cause each top level visual to be updated on screen.

Remote Transport

As described above, the high-level engine 206 produces related sets of data that are transported to the low-level engine 210, including resources $1204_1$-$1204_3$ (FIG. 12), e.g., images and text glyphs, animation intervals/variables that describe how a variable used for rendering changes over a short period of time along with information on where it is used, and instruction lists that describe the positioning rendering operations required to render a top-level visual (window). Instruction lists can contain references to variables in place of static values.

First, the high-level engine 206 creates the resources, which need to be created before use, and are referenced by opaque handles in instruction list. The high-level engine 206 creates resources by first creating a device independent representation of the resource. In the case of an image the representation is a full-frame bitmap or an encoded image in a format such as JPEG. For communication, the high-level engine 206 then submits the resource data to a communication stub which assigns it a unique handle. The handle is generated in the high-level engine 206 process and is unique only within that process.

Figure 16:
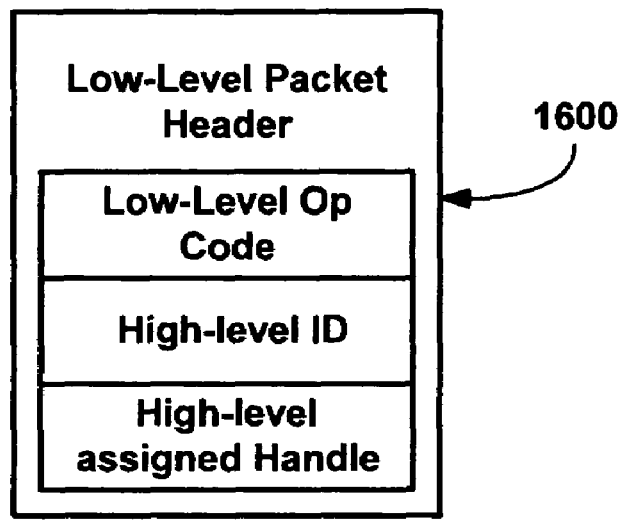
Figure 17:
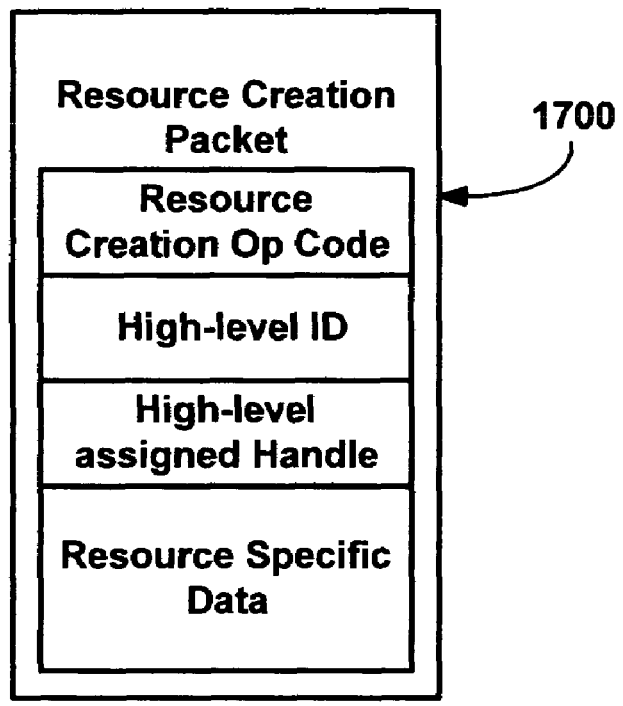
Figure 18:
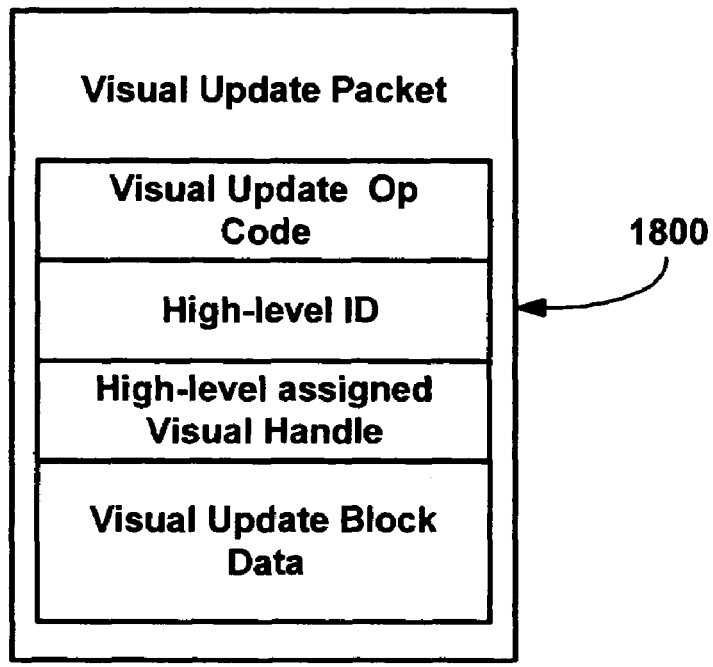
Figure 19:
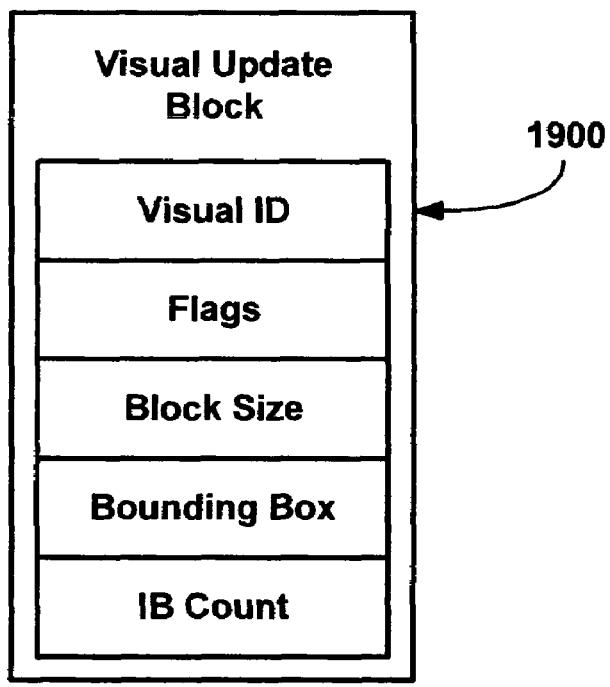
Figure 20:
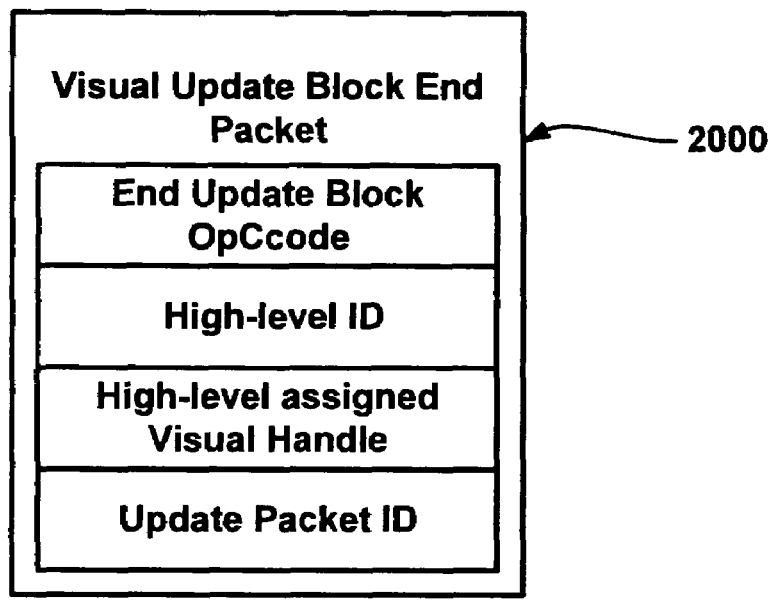
Figure 21:
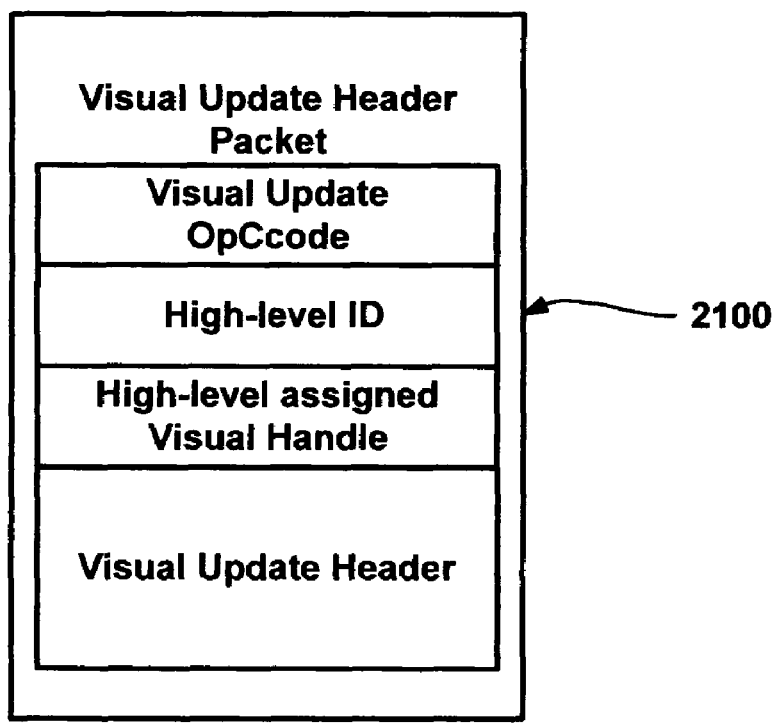
Figure 22:
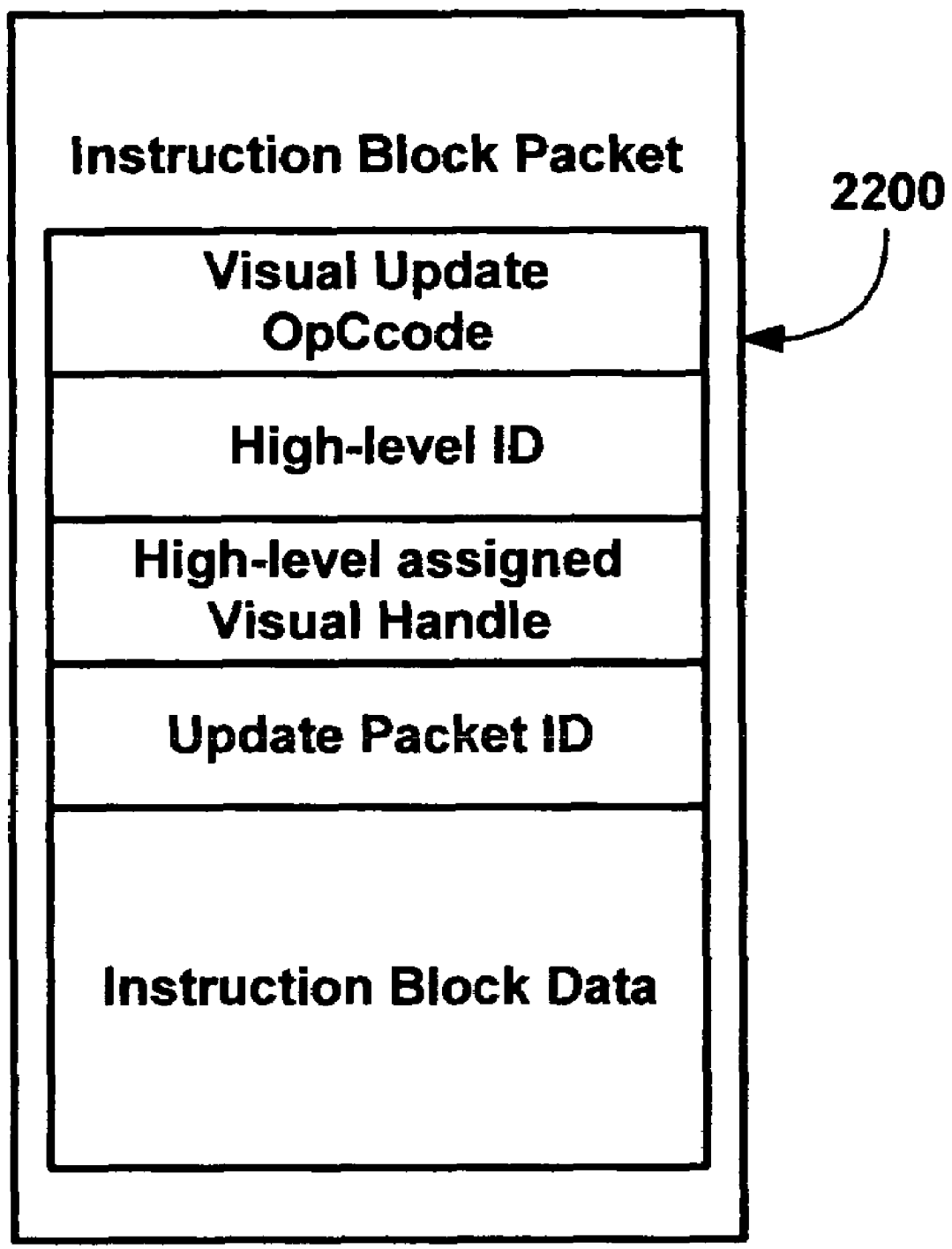

As represented in FIG. 16, the communication stub packages the resource data in a data structure 1600 with a header specifying the type of the operation and the handle. The stub immediately returns the handle to the high-level engine 206 for use in rendering.

Instruction lists, variables, time values and animation intervals work together. The instruction list describes the rendering and may contain references to variables in place of static values. Animation intervals describe how to vary the value of the variable over a short period of time.

The high-level engine 206 collects instruction lists and animation intervals as part of its rendering pass. The high-level engine 206 packages the rendering information into one or more instruction blocks per top-level visual (window). Each block represents a subtree of the graph for a particular window. Each block contains a list of variables that affect the instruction list. The instruction lists maintained in the high-level engine 206 include references to the variables used. These variable references are collected for each variable and converted into locations (offsets) in the instruction list that must be replaced by the instantaneous of the variable before rendering. These offsets are packaged with the animation interval information for that block, as generally represented in FIGS. 16-22.

FIG. 15 shows visual update data structures. In general, the collection of instruction blocks describing a window is collected into a visual update block 1114, as described above. The update block is then packaged into a packet in the same way as the resource described above. Update blocks may be large and could be sent in multiple packets if that is more efficient for the transport.

Figure 23:
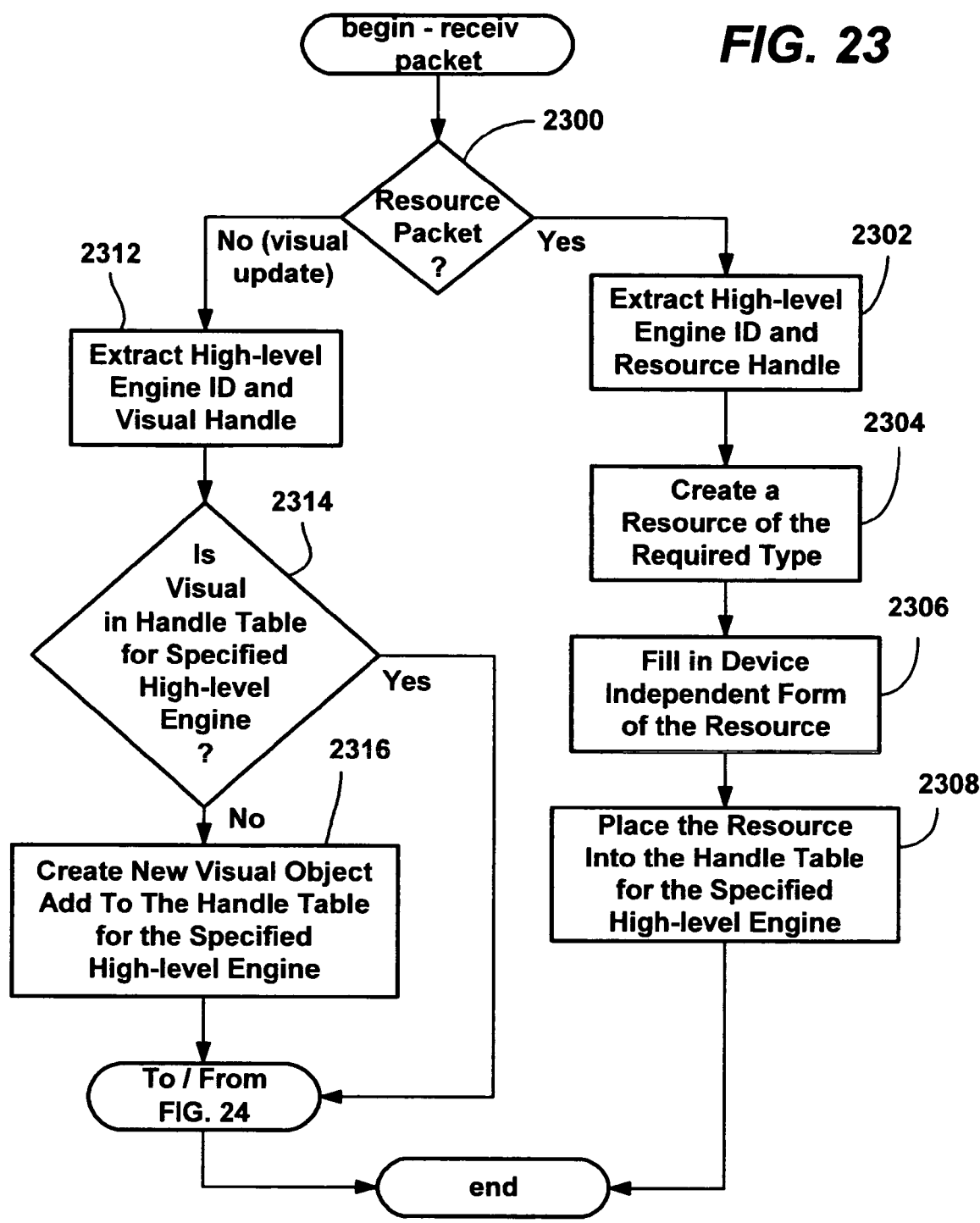
FIGS. 23 and 24 comprise a flow diagram generally representing processing of data packets to produce graphics output in accordance with an aspect of the present invention.

The low-level engine 210 has a normal priority thread that listens to the transport stream and process packets as they arrive. The work is preferably done on a separate thread from the render thread to ensure the low-level engine 210 can render every refresh. The communication thread parses each packet based on the operation code (opcode), high-level engine identifier (ID), object handle. The processing for these resource and visual update scenarios, are described with reference to FIG. 23.

More particularly, resource packets are processed when the low-level engine 210 recognizes that a received packet is for a resource 1204 (step 2300). The low-level engine 210 then extracts the high-level engine 206 ID and the resource handle at step 2302, and creates a resource of the required type at step 2304. The low-level engine 210 fills in the device independent form of the resource at step 2306, and places the resource into a handle table for the specified high-level engine 206 (step 2308).

Figure 24:
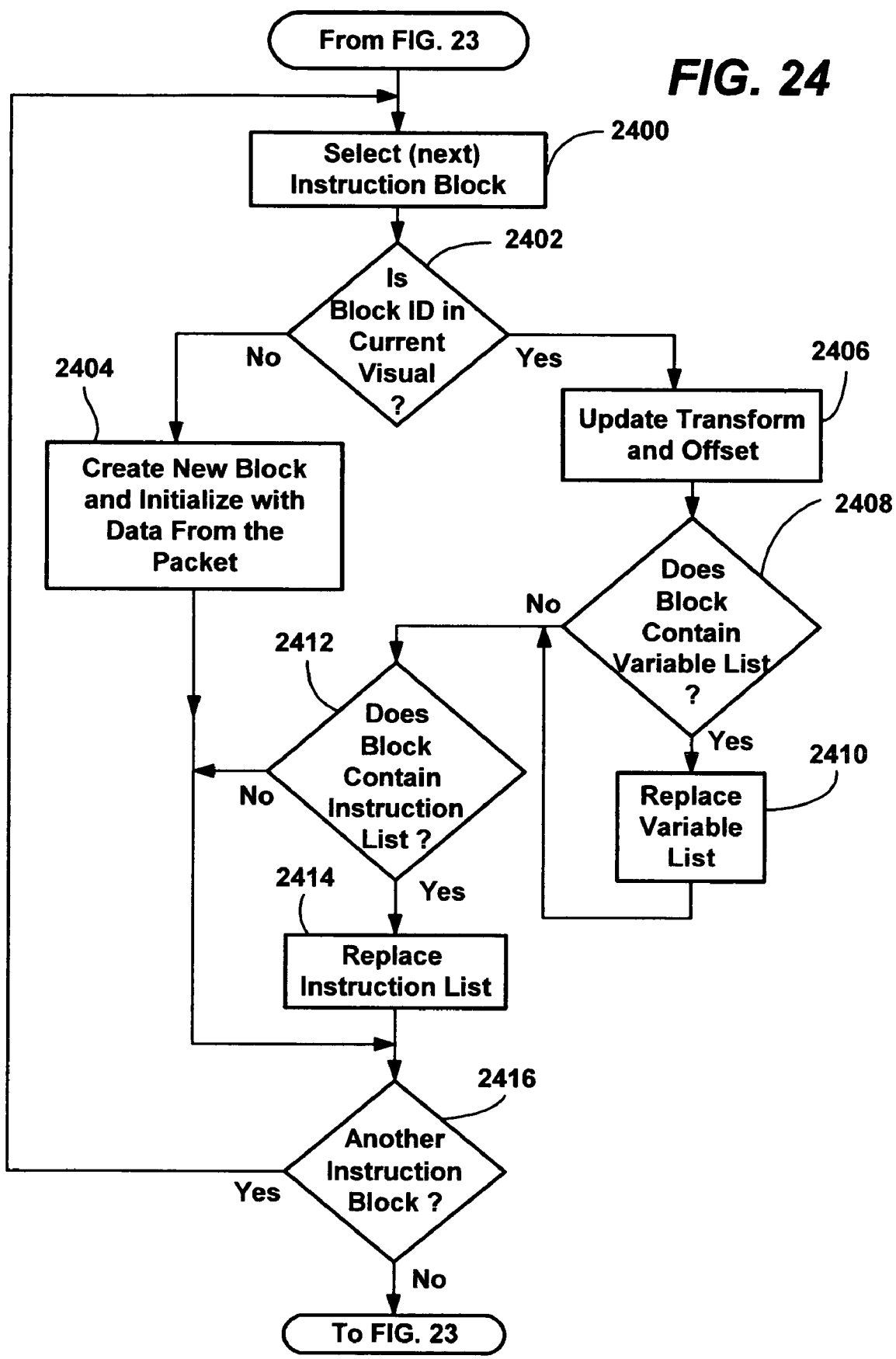

Single packet visual update blocks are handled similarly to the resource packets, but with more processing. When at step 2300 the low-level engine 210 recognizes the packet is a visual update block 1114, the process branches to step 2312. At step 2312, the low-level engine 210 extracts the high-level engine ID and visual handle from the packet. The low-level engine 210 then looks up the visual in the handle table for the specified high-level engine 206 at step 2314. If the visual is not found, a new visual object is created and added to the handle table at step 2316. The low-level engine 210 then loops through each of the instruction blocks in the packet, as represented in FIG. 24 via steps 2400 and 2416.

To this end, at step 2400 the low-level engine 210 selects an instruction block and looks up the block ID in the current visual at step 2402. If the block identifier does not exist, the new block is created and initialized with data from the packet. If instead the block identifier exists, the low-level engine 210 updates the transform and offset (step 2406) If the block contains a variable list, the existing variable list is replaced via steps 2408 and 2410. If the block contains an instruction list, the existing instruction list is replaced via steps 2412 and 2414.

The multiple packet case is handled the same as the single packet case. The only distinction is that the low-level engine 210 first assembles the visual update block from multiple packets.

As can be readily appreciated, because graphics instructions are sent rather than individual graphics bits, the amount of data that needs to be communicated between the high-level engine and low-level engine is significantly reduced. As a result, the graphics instructions from the high-level processing system can be transmitted over a network connection to remote terminals, which each have a low-level processing system. The resultant graphics output can appear substantially the same over a number of terminals, even though the bandwidth of the connection could not carry conventional graphics data.

CONCLUSION

As can be seen from the foregoing detailed description, there is provided a multiple level graphics processing system and method that facilitates complex processing, including handling animation computations, at a relatively low frequency to enable complex graphics output at a relatively high frequency. The low-level system receives interval data which is straightforward to use in computing the progress of an animation. The system and method thus enable improved graphics output, including smooth animation, graphics composition and video and audio, by utilizing multiple processing levels to leverage a greater amount of the graphics subsystem power. Moreover, the multiple levels facilitates remote communication of graphics instructions and data to terminals that result in complex graphics output.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
a computer processor;
computer system memory;
a first component comprising a tree of clocks hierarchically related by synchronization rules and primitives, an event list generator, an interval generator, and a high-level timing component,
 wherein the clocks correspond to clock properties received from an application program,
 wherein the event list generator comprises a state machine and groups events initially scheduled by specified clock properties together with explicit interactive events received with respect to an animation into an event list,
 wherein the states of the state machine comprise inactive, active, pause, and resume, and
 wherein the interval generator uses the event list to compute a corresponding interval list;
a second component comprising a low-level timing component and a low-level computation engine,
 wherein the second component receives the interval list from the first component,
 wherein the low-level component interpolates parameter intervals to obtain instantaneous values and decodes instructions into rendering commands to be executed by a graphics device, and
 wherein the low-level computation engine controls output based on current time and interpolates the location of an animated object based on interval data and current time;
a system clock which provides consistent time to both the high-level timing component and the low-level timing component and enabling the first component and the second component to remain in synchronization; and
an animation function subsystem that determines a current value for a varying property of an animated object.

2. The system of claim 1 wherein the output corresponds to a progress of an animation having an animated characteristic.

3. The system of claim 1 wherein the second component determines the output by interpolating a current progress value for the animated characteristic.

4. The system of claim 1 wherein the second component computes the output at a fast operating rate relative to an operating rate of the first component.

5. The system of claim 1, wherein the interval generator computes the interval data from an event list provided by the event list generator, the event list based on the clock data.

6. The system of claim 5 wherein the first component receives an interactive event, and wherein the event list generator further adds the interactive event into the event list.

7. The system of claim 6 wherein the event list generator further adds at least one implicit event into the event list.

8. The system of claim 6 wherein the event list generator marks at least one event in the event list as unused, the interval generation mechanism not using an unused event in computing the interval data.

9. The system of claim 1 wherein the clock data comprises property information corresponding to a begin time value and a duration.

10. The system of claim 1 wherein the clock data comprises property information corresponding to a repeat count.

11. The system of claim 1 wherein the clock data comprises property information corresponding to a reverse instruction.

12. The system of claim 1 wherein the clock data comprises property information corresponding to acceleration data.

13. The system of claim 1 wherein the clock data comprises property information corresponding to deceleration data.

14. The system of claim 1 wherein the clock data comprises property information corresponding to a seek instruction.

15. The system of claim 1 wherein the clock data comprises property information corresponding to speed data.

16. The system of claim 1 wherein the clock data comprises property information corresponding to function data.

17. The system of claim 1 wherein the first component and second component execute on different threads.

18. In a computing environment comprising a computer processor and computer system memory, a method comprising:
a first component receiving clock data and graphics data, the first component comprising a tree of clocks hierarchically related by synchronization rules and primitives, an event list generator, an interval generator, and a high-level timing component, and wherein the clocks correspond to clock properties received from an application program;
 the event list generator grouping together explicit interactive events with events initially scheduled by specified clock properties;
 the event list generator walking a combined list of scheduled and interactive events and inserting implicit events;
 the event list generator generating an event list from clock properties and interactive events, wherein the event list generator comprises a state machine and groups events initially scheduled by specified clock properties together with explicit interactive events received with respect to an animation into the event list and wherein the states of the state machine comprise inactive, active, pause, and resume;
pairing off events to form intervals wherein there is an interval for every pair of consecutive events;
an interval generator generating an interval list from the event list and the clock data;
a second component receiving the interval list, the second component comprising a low-level timing component and a low-level computation engine;
the second component interpolating the location of an animated object based on interval data and current time to obtain instantaneous values and the second component also controlling output based on current time and decoding instructions into rendering commands to be executed by a graphics device;
the second component providing a progress value to a low-level animation subsystem;
the low-level animation subsystem determining a current value for a varying property of an animated object;
receiving a consistent time from a system clock at both the high-level timing component and the low-level timing component for enabling the first component and the second component to remain in synchronization; and using an animation function subsystem to determine a current value for varying property of the animated object.

19. The method of claim 18 wherein causing output to be produced based on the current time data and the interval data comprises, determining an interval, and determining a progress value within that interval.

20. The method of claim 19 further comprising, causing an animation property value to be determined based on the progress value, such that the animation property value varies as the current time varies.

21. The method of claim 18 wherein generating interval data based on the clock data includes, building an event list based on the clock data, and processing the event list to generate the interval data.

22. The method of claim 21 further comprising receiving an interactive event, and further comprising, building a modified event list based on the clock data and the interactive event.

23. The method of claim 22 wherein building a modified event list comprises adding an implicit event based on the interactive event.

24. The method of claim 22 further comprising, marking an event as unused based on the interactive event.

25. The method of claim 18 wherein causing output to be produced based on current time data and the interval data comprises constructing a frame at a rate that corresponds to a frame refresh rate of a graphics subsystem.

26. A computer-readable storage medium having encoded thereon stored computer-executable instructions for performing the method of claim 18.

* * * * *